(12) United States Patent  
Hwang et al.

(10) Patent No.: US 10,984,192 B2  
(45) Date of Patent: Apr. 20, 2021

(54) APPLICATION LIST PROVIDING METHOD AND DEVICE THEREFOR

(71) Applicant: Samsung Electronics Co., Ltd., Suwon-si (KR)

(72) Inventors: Sung Jae Hwang, Seoul (KR); Kang Hak Kim, Gunpo-si (KR); Jeong Hoon Son, Seoul (KR); Ju Wan Lee, Seoul (KR); Seo Young Son, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 127 days.

(21) Appl. No.: 16/306,791

(22) PCT Filed: Jun. 2, 2017

(86) PCT No.: PCT/KR2017/005791  
§ 371 (c)(1),  
(2) Date: Dec. 3, 2018

(87) PCT Pub. No.: WO2017/209564  
PCT Pub. Date: Dec. 7, 2017

(65) Prior Publication Data  
US 2020/0242303 A1 Jul. 30, 2020

(30) Foreign Application Priority Data

Jun. 2, 2016 (KR) .......................... 10-2016-0068983  
Jun. 20, 2016 (KR) .......................... 10-2016-0076777

(51) Int. Cl.  
*G06F 40/279* (2020.01)  
*G06F 40/30* (2020.01)  
(Continued)

(52) U.S. Cl.  
CPC ........ *G06F 40/279* (2020.01); *G06F 16/9038* (2019.01); *G06F 21/44* (2013.01)

(58) Field of Classification Search  
CPC .... G06F 40/211; G06F 40/253; G06F 40/268; G06F 40/284; G06F 40/30  
See application file for complete search history.

(56) References Cited

U.S. PATENT DOCUMENTS 9,367,403 B2 * 6/2016 Hou ..................... G06F 11/1469  
9,430,120 B2 * 8/2016 Cranfill ............... G06F 3/04817  
(Continued)

FOREIGN PATENT DOCUMENTS

KR 10-2012-0049542 A 5/2012  
KR 10-2013-0058856 A 6/2013  
(Continued)

OTHER PUBLICATIONS

Task Switching Multi-Tasking User Interface Design for Application Working State Recognition, Dec. 31, 2014.

*Primary Examiner* — Lamont M Spooner  
(74) *Attorney, Agent, or Firm* — Jefferson IP Law, LLP

(57) ABSTRACT

Provided is a method for providing a related application list on the basis of a message. An application list providing method according to an embodiment of the present invention, which is performed by an application list providing device, may comprise the steps of: receiving a provided message; determining a keyword on the basis of the message; determining an application list associated with the message by using the determined keyword, wherein the application list includes at least one application (APP); generating a deep link for at least one application included in the application list by using the determined keyword; and providing the application list and the deep link.

14 Claims, 27 Drawing Sheets

(51) Int. Cl.
    *H04L 12/58*             (2006.01)
    *G06F 16/9038*       (2019.01)
    *G06F 21/44*             (2013.01)

(56) References Cited

U.S. PATENT DOCUMENTS

| | | | |
|---|---|---|---|
| 9,607,332 B1* | 3/2017 | Nazarov | G06Q 30/0631 |
| 10,310,957 B2* | 6/2019 | Cudak | G06F 11/302 |
| 2006/0256935 A1* | 11/2006 | Tofts | H04M 3/5166 |
| | | | 379/88.2 |
| 2008/0125180 A1* | 5/2008 | Hoffman | H04M 1/72583 |
| | | | 455/566 |
| 2008/0209551 A1* | 8/2008 | Treacy | G06F 21/53 |
| | | | 726/22 |
| 2009/0164914 A1* | 6/2009 | Chen | H04N 21/4786 |
| | | | 715/753 |
| 2013/0138674 A1 | 5/2013 | Jeong et al. | |
| 2013/0324097 A1* | 12/2013 | Roberts | H04L 67/34 |
| | | | 455/418 |
| 2014/0059135 A1 | 2/2014 | Stan et al. | |
| 2014/0173460 A1 | 6/2014 | Kim | |
| 2015/0278033 A1* | 10/2015 | Hou | G06F 11/1469 |
| | | | 714/19 |
| 2016/0055246 A1* | 2/2016 | Marcin | G06F 40/295 |
| | | | 707/732 |
| 2016/0057205 A1* | 2/2016 | Wang | G06F 3/04817 |
| | | | 715/748 |
| 2016/0196055 A1* | 7/2016 | Park | G06F 3/04845 |
| | | | 715/768 |
| 2016/0301639 A1* | 10/2016 | Liu | H04L 51/32 |
| 2017/0083209 A1* | 3/2017 | Cranfill | G06F 3/04817 |
| 2017/0180276 A1* | 6/2017 | Gershony | H04L 51/20 |
| 2017/0185250 A1* | 6/2017 | Cho | G06F 3/0482 |
| 2017/0242711 A1* | 8/2017 | Dey | G06F 8/60 |
| 2017/0329690 A1* | 11/2017 | Cudak | G06F 11/3452 |
| 2018/0032997 A1* | 2/2018 | Gordon | G06Q 30/0269 |
| 2018/0077543 A1* | 3/2018 | Cho | G06Q 10/00 |

FOREIGN PATENT DOCUMENTS

| | | | |
|---|---|---|---|
| KR | 10-2013-0065802 A | 6/2013 | |
| KR | 10-2014-0078031 A | 6/2014 | |
| KR | 10-2014-0090114 A | 7/2014 | |
| KR | 10-2015-0006116 A | 1/2015 | |
| KR | 10-2015-0080275 A | 7/2015 | |
| KR | 10-1564239 B1 | 10/2015 | |

* cited by examiner

APPLICATION LIST PROVIDING METHOD AND DEVICE THEREFOR

TECHNICAL FIELD

The present invention relates to methods and devices for providing, based on a message, an application list related thereto. More specifically, the present invention relates to methods and devices for providing an application list containing a deep link based on the text and context of a message received and displaying the application list in a user-friendly manner.

BACKGROUND ART

As laptop computers, smartphones, smart pads, or other handheld portable smart devices become widely used, users may conveniently communicate messages with other parties on their portable smart device, and message transmission-related applications have a diversity of functionalities.

Further, the spread of mobile devices is leading to increased use of applications rather than mobile web, and this trend is expected to further accelerate. On top of that, adopting deep links, which include in-app direct links, is gradually rising in order to present enhanced results of search on the app or enable inter-app service interworking.

Further, users are installing and storing a number of apps on their smartphone or other mobile devices equipped with various functionalities in various sectors, and they are conducting effective searches or relevant tasks using various apps fitting the context of messaging with other parties. However, this way requires the user to do such tasks on their own, thus leading to deteriorated user convenience. Thus, the need arises for a method capable of automatically providing a message-related app list to further enhance user convenience.

Meanwhile, there has been a recent increase in the use of wearable devices such as smart glasses, smart watches, smart rings, or smart necklaces.

By the nature of being worn on the user's body for a long continuous period of time and because they are required to allow the user to feel comfortable while wearing them, wearable devices are subject to physical limitations in shape or size. For example, smart watches that are wrist-wearable are designed without significantly departing from traditional wrist watches in size and shape and thus cannot come with as large a display as laptops or smart pads.

Therefore, the factors that play a critical role in spreading wearable devices relies on allowing them to carry out all the functions that other normal smart devices can on their small display.

DETAILED DESCRIPTION OF THE INVENTION

Technical Problem

The present invention aims to provide a method for effectively providing a pertinent app list per user or per context based on messages communicated between users and a device for performing the same.

Specifically, a technical objective of the present invention is to provide a method, as well as a device for performing the method, capable of recommending a context-fitting app list using the text and context information of the conversation between users.

Another technical objective of the present invention is to provide a method, as well as a device for performing the method, for producing a deep link to enable direct linking to a particular page of an app fitting the user's intention, as well as executing the app fitting the user's intention and providing an app list containing the deep link.

Yet another technical objective of the present invention is to provide a method, and a device for performing the method, for providing a customized app list per user by comprehensively reflecting the time, place, user's context, and other party in the conversation.

Yet another technical objective of the present invention is to provide a method, and a device for performing the method, for allowing an app fitting the user's intention to be conveniently executed during a conversation by displaying an app fitting the user's intention and the context of conversation based on the user's conversation.

Yet another technical objective of the present invention is to provide a method, and a device for performing the method, for displaying in a user-friendly manner in order to allow for a convenient choice of a particular app of an app list.

Yet another technical objective of the present invention is to provide a method, and a device for performing the method, for providing an appropriate app list even when there are multiple keywords in a message received and displaying in a user-friendly manner in order to allow for a convenient choice of a particular app.

Yet another technical objective of the present invention is to provide a method, and a device for performing the method, for effectively displaying and arraying based on, e.g., the type, category, execution scheme, or link information of various apps of an app list.

Objects of the present invention are not limited to the foregoing, and other unmentioned objects would be apparent to one of ordinary skill in the art from the following description.

Technical Solution

To achieve the foregoing objectives, according to an embodiment of the present invention, a method for providing an app list by a device for providing the app list may comprise receiving a message, determining a keyword based on the message, determining an app list related to the message using the determined keyword, the app list including at least one app, generating a deep link for the at least one app included in the app list using the determined keyword, and providing the app list and the deep link.

In an embodiment, receiving the message may include receiving a message group including the message, and determining the keyword may include determining the keyword using another message included in the message group, along with the message.

In an embodiment, determining the keyword may include determining the keyword through named-entity recognition (NER) on the message and classifying the keyword by category, and determining the app list related to the message may include determining the app list related to the message further using a category of the keyword.

In an embodiment, generating the deep link may include determining whether the at least one app is installed on a recipient's terminal, and for a non-installed app, generating a deep link to enable installation of the non-installed app.

To achieve the foregoing objectives, according to an embodiment of the present invention, a device for providing an app list may comprise a network interface, at least one processor, a memory configured to load a computer program performed by the processor, and a storage configured to store an app related to a particular keyword, wherein the computer program may include the operation of receiving a message, the operation of determining a keyword based on the message, the operation of determining an app list related to the message using the determined keyword, the app list including at least one app, the operation of generating a deep link for the at least one app included in the app list using the determined keyword, and the operation of providing the app list and the deep link.

To achieve the foregoing objectives, according to an embodiment of the present invention, a method for providing an app list by a device for providing the app list may comprise determining at least one keyword based on a message received and displaying an app list including at least one app determined based on the keyword, wherein the at least one app may be an app related to the message.

In an embodiment, when the keyword includes a first keyword and a second keyword, displaying the app list may include distinctively displaying a first app list determined based on the first keyword and a second app list determined based on the second keyword.

In an embodiment, displaying the app list may include displaying, along with the app list, a marker for indicating an entity of app for at least one app included in the app list.

In an embodiment, displaying the app list may include displaying preview information related to the keyword along with each app.

In an embodiment, displaying the app list may include displaying an advertisement-related app of at least one app included in the app list distinctively from other apps.

In an embodiment, when the keyword includes a first meaning and a second meaning, displaying the app list may include distinctively displaying a first app list determined based on the first meaning and a second app list determined based on the second meaning.

The present invention as set forth above may automatically provide an app list fitting the user's intention using the text and context information of a message, thus allowing the user to run their desired app without separate manipulation (e.g., an app search). This may enhance user convenience.

Further, the present invention may execute an app and perform the relevant task and resume the conversation on the messenger even without terminating the messenger. This may lead to further enhanced user convenience.

Further, the present invention may provide an app recommendation service customized for each individual user using the user's personalized information. Thus, the app recommendation may become more accurate, and user convenience may improve.

There may also be provided various embodiments including displaying together keywords and a marker indicating the entity of an app to enable a convenient choice of a particular app of an app list recommended. Thus, user convenience may be maximized.

Further, the present invention may effectively provide and display an app list to the user even when a message contains multiple keywords and provide an effective app display and app arraying method based on, e.g., the type, category, execution scheme, and link information of the apps of the app list, thereby enhancing user convenience.

Other effects of the present invention are not limited to the foregoing and other effects will be apparent to one of ordinary skill in the art from the following detailed description.

BRIEF DESCRIPTION OF DRAWINGS

FIG. 26 is a view illustrating an example of excluding a keyword according to an embodiment of the present invention;

MODE FOR CARRYING OUT THE INVENTION

Figure 1:
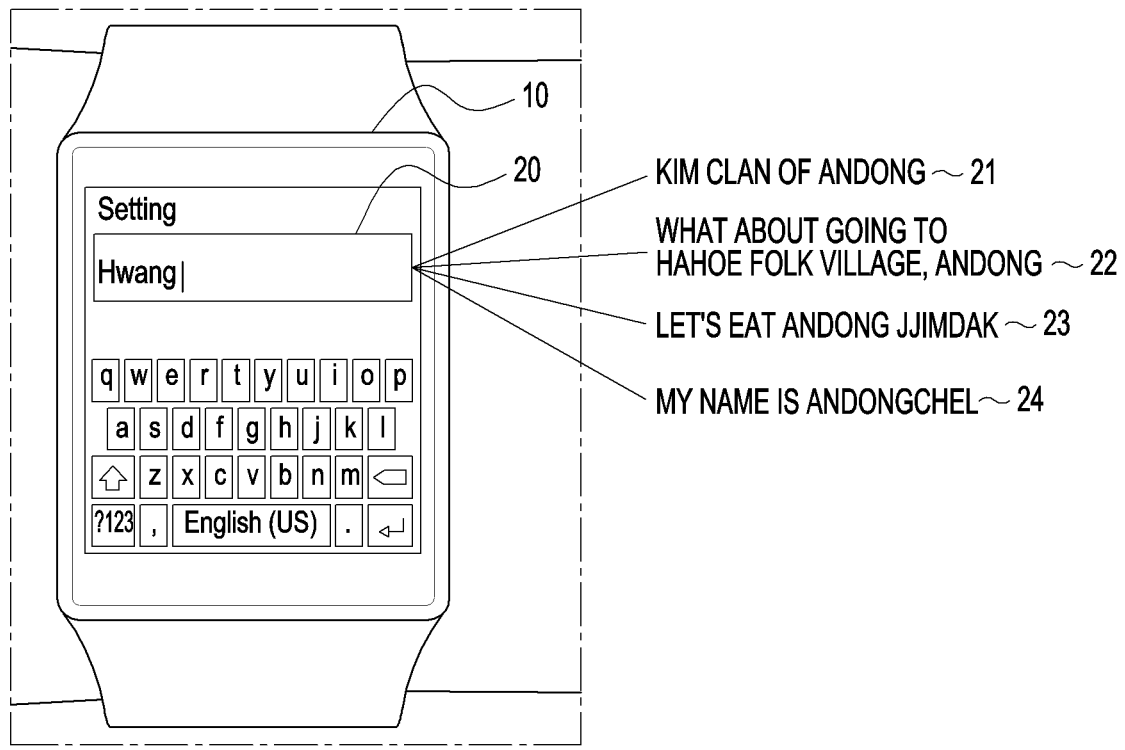
FIG. 1 is a view illustrating an example of a conversation inputtable on a wearable device.

Hereinafter, embodiments of the present invention are described in detail with reference to the accompanying drawings. Advantages and features of the present disclosure, and methods for achieving the same may be understood through the embodiments to be described below taken in conjunction with the accompanying drawings. However, the present disclosure is not limited to the embodiments disclosed herein, and various changes may be made thereto. The embodiments disclosed herein are provided only to inform one of ordinary skilled in the art of the category of the present disclosure. The present disclosure is defined only by the appended claims. The same reference numeral denotes the same element throughout the specification.

Unless defined otherwise, all the terms (including technical and scientific terms) used herein may be construed as commonly appreciated by one of ordinary skill in the art to which the present invention pertains. Further, terms defined in a dictionary commonly used are not ideally or overly interpreted unless defined expressly or specifically. The terms as used herein are provided merely to describe some embodiments thereof, but not intended as limiting the present invention. As used herein, the singular forms "a," "an," and "the" are intended to include the plural forms as well, unless the context clearly indicates otherwise.

As used herein, the term "comprises" and/or "comprising" does not exclude the presence or addition of one or more other components, steps, operations, and/or elements other than the component, step, operation, and/or element already mentioned.

Hereinafter, the present invention is described in greater detail with reference to the accompanying drawings.

FIG. 1 is a view illustrating an example of a conversation message inputtable on a wearable device.

A wearable device 10 is a next-generation smart device and has recently under vigorous research efforts. The wearable device 10 may advantageously be put on the user's body in a convenient manner, but its small screen may be inconvenient to users who are used to larger screens. To eliminate such inconvenience, the need arises for a method for analyzing the conversation with the other party, recommending an app relevant thereto, or providing a direct link to a corresponding page of the relevant app. Of course, such a method is also needed for large-screen smart devices for the purpose of user convenience.

The user may input various conversation messages through an input window 20 of the wearable device 10. FIG. 1 illustrates some examples of conversation messages including "Andong." As illustrated in FIG. 1, the user may enter conversation messages, such as "Kim clan of Andong" 21, "What about going to Hahoe Folk Village, Andong?" 22, "Let's eat Andong jjimdak" 23, and "My name is Andongchel" 24, through the keyboard displayed on the wearable device 10.

Here, if conversation pair data containing a particular word is able to be pre-processed to grasp entities related to the particular word, the user of the wearable device 10 may be recommended apps as per a predefined category and a deep link to a particular page of the app may be generated using named-entity recognition (NER) technology. Accordingly, the user convenience of the wearable device 10 may be significantly enhanced. Described below in detail are a system, method, and device for recommending a pertinent app list based on conversation messages.

Figure 2:
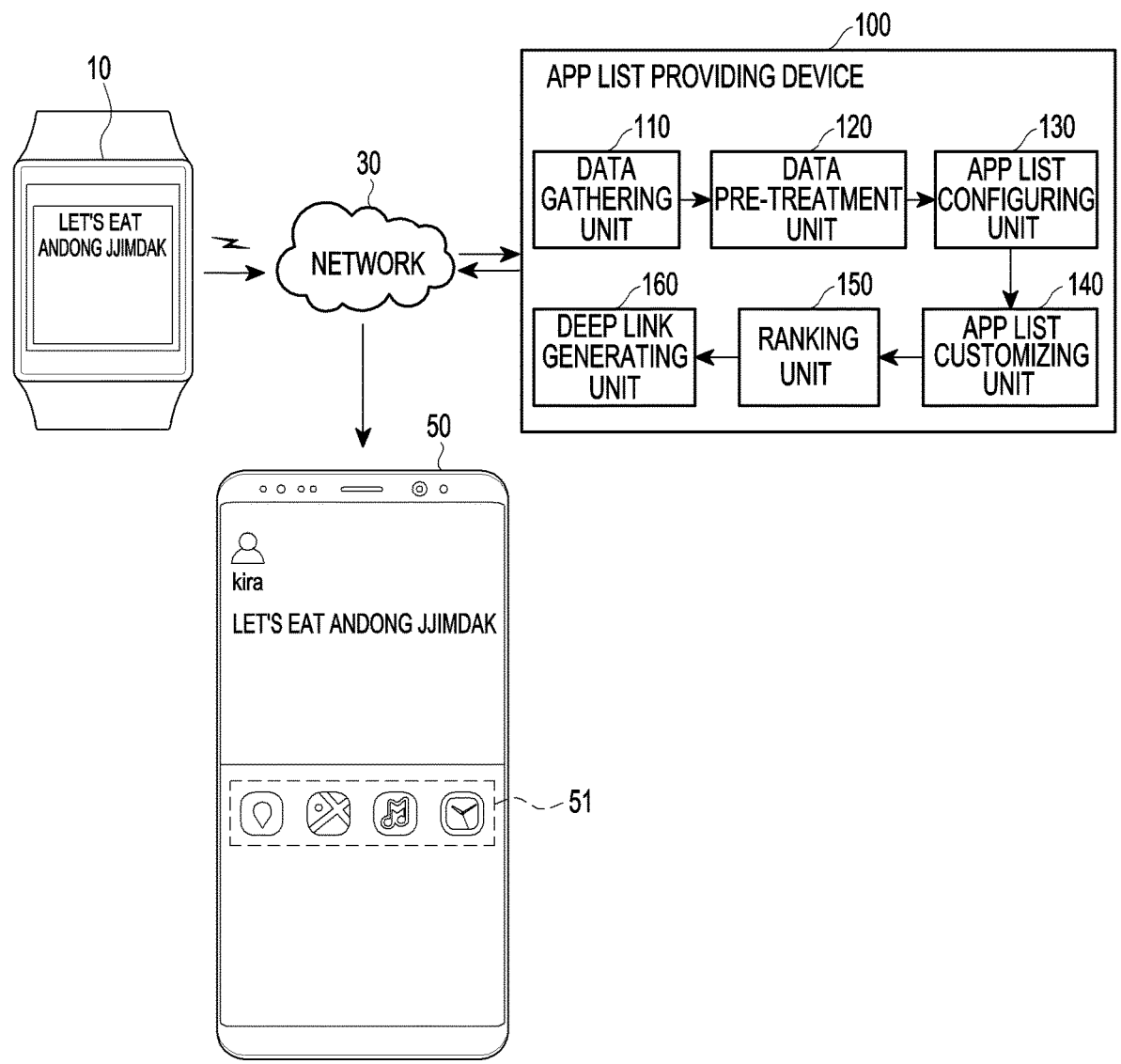
FIG. 2 is a view illustrating a configuration of an app list providing system according to an embodiment of the present invention.

FIG. 2 is a view illustrating a configuration of an app list providing system according to an embodiment of the present invention.

Referring to FIG. 2, an app list providing system may include a first device 10, a second device 50, a network 30, and an app list providing device 100. However, this is merely a preferred embodiment to achieve the objectives of the present invention, and it is apparent that some components may be added or deleted as necessary.

Here, the first device 10 and the second device 50 may be smart devices communicable over the network 30. FIG. 1 illustrates an example in which the first device 10 is a wearable device, and the second device 50 is a smartphone. However, the first device 10 and the second device 50 of FIG. 2 are merely an example, and the first device 10 and the second device 50 may be any type of computing device equipped with computational means and communication means.

For example, the first device 10 and the second device 50 may be, but are not limited to, desktop computers, workstations, PDAs, portable computers, cordless phones, mobile phones, smartphones, e-book readers, PMPs, portable game players, navigation devices, black boxes, digital cameras, or televisions.

As another example, the first device 10 and the second device 50 may be provided as one of various components of an electronic device, such as devices capable of transmitting and receiving information in a wireless environment, various electronic devices constituting a home network, various electronic devices constituting a computer network, various electronic devices constituting a telematics network, smart cards, or various components constituting a computing system, but are not limited thereto.

The first device 10 may communicate with the second device 50 through the network 30. Here, the network 30 may be configured in various types, regardless of whether it uses wired communication or wireless communication, or as any communication network, such as a local area network (LAN), a metropolitan area network (MAN), or a wide area network (WAN).

It is assumed that the user of the first device 10 enters the conversation message "Let's eat Andong jjimdak" 23 and transmits the message to the second device 50 as illustrated in FIG. 2.

In the case of a general message transmission system, the conversation text entered on the first device 10 is transmitted, as it is, to the second device 50. However, according to an embodiment of the present invention, the app list providing device 100 transmits a recommended app list 51 together with the entered conversation message to the second device 50, based on the conversation message entered on the first device 10.

Referring to FIG. 2, the app list providing device 100 may include a data gathering unit 110, a data pre-treatment unit 120, an app list configuring unit 130, an app list customizing unit 140, a ranking unit 150, and a deep link generating unit 160. FIG. 2, however, illustrates only components related to embodiments of the present invention. Thus, it would be appreciated by one of ordinary skill in the art that other general-purpose components other than those shown in FIG. 2 may be added. It should also be noted that the components of the app list providing device 110 shown in FIG. 2 refer to functional elements functionally differentiated from each other, and at least one of the components may be integrated with another in an actual physical environment.

Although not illustrated in FIG. 2, the app list providing device 100 may further include an app list DB (not shown) or a deep link DB (not shown). However, without being limited thereto, an app list DB (not shown) or a deep link DB (not shown) may be positioned outside the app list providing device 100.

The data gathering unit 110 may receive and store messages between users, and in response, gather entered messages as conversation information. Further, the data gathering unit 110 may gather not only conversation messages communicated on the messenger between the users but also other various data obtainable online, such as social media or blogs.

That is, the data gathering unit 110 does not necessarily gather only conversation pair data but may gather data regarding, e.g., Twitter or other such social media services, blogs, or other sentences provided online. The sentences gathered thus may be utilized in learning a named-entity recognition algorithm through machine learning.

Further, the data gathering unit 110 may gather not only a particular message, which the first device 10 sends to the second device 50, but also a message group containing the particular message and put the same to use for analysis. In other words, the overall context of the text may be precisely grasped by analyzing the message group, which includes messages related to, e.g., the time, place, or the other party of the message, rather than merely analyzing a single message to figure out the context.

For example, other messages exchanged between the first device 10 and the second device 50 may be used to grasp the context. In such a case, the message group may include a message exchanged between the first device 10 and the second device 50 among messages generated prior to the particular message.

As another example, a message group further including a message generated by another device in the place where the first device 10 generates a message to be sent to the second device 50 may be put to use for analysis to figure out the message that the first device 10 sends. This is intended to reflect the situation in which the same word may differ in meaning depending on geographical spaces or social spaces, e.g., school or workplace.

The data pre-treatment unit 120 may pre-process the gathered conversation information data, manage data, and impart an entity to the gathered conversation information. Specifically, the data pre-treatment unit 120 may purify gathered conversation information or sentence and tag and associate an entity with a particular word or keyword in the sentence. The data pre-treatment unit 120 may take advantage of a named-entity recognition algorithm to impart an entity to a word or keyword contained in the gathered conversation information.

The named-entity recognition algorithm is a method for matching a pre-designated entity with a particular word or keyword previously defined in a sentence. The named-entity recognition algorithm includes three examples: dictionary-based matching, grammar-based matching, and a statistical method. The named-entity recognition algorithm may combine and use the above-enumerated examples in various ways other than designating and using only one of the three examples.

The named-entity recognition algorithm may recognize the entity name to be assigned to an entity by grammar-based matching. What entity is to be assigned to an entity name may use dictionary-based matching. In this case, if multiple entities are matchable, one entity may be chosen by a pattern learned by a statistic method and be matched to a particular word or keyword.

The app list configuring unit 130 may estimate the category of the keyword and/or the category of an app related to the keyword from the entity assigned by the data pre-treatment unit 120. That is, the contextual flow of the conversation may be figured out from the association between the conversation text and the particular entity and the category may thus be classified. The app list configuring unit 130 may grasp the flow of the conversation based on the gathered conversation information or sentence information and send a request for app information related to the category stored in the app list DB (not shown). A recommended app list may be produced from the category-related app information.

For example, referring to FIG. 2, the message "Let's eat Andong jjimdak" that has been transmitted from the first device 10 may be analyzed to figure out the category of "Andong jjimdak" as <menu> and the category of "Let's eat" as <verb>, and then, a list of apps related to <menu> are looked up on the app list DB (not shown) and are associated with the <verb> "Let's eat," and as a result, an app list 51 for ordering food is transmitted along with the message to the second device 50.

During the course, the app list customizing unit 140 reconfigures the app list using personalized information about the first device 10 or the second device 50. Here, the concept of personalized information encompasses information regarding the device itself, such as the identifier or location information of the device or information regarding the user of the device, such as an ID or email address. For example, there may be reconfigured and provided the app list 51 for ordering food taking into consideration the location information of the first device 10 or the location information of the second device 50.

The personalized information is described in greater detail. The personalized information encompasses, in its concept, one or more of personal information about each device user, terminal device information, the app usage pattern of each device user, and context information.

The personal information may include, e.g., age, gender, or vocation. Since words spelled the same may differ in meaning depending on social hierarchy, the user's personal information may be used for analysis, if known. Further, schedule information, biometric information, preference information, activity information, and social relationship between the sender and recipient may further be taken into consideration.

Here, the biometric information may be one or more of, e.g., pulse, blood pressure, calorie consumption, sweat quantity, body temperature, respiratory condition, oral condition, electromyogram, electrocardiogram, brain wave, fingerprint, iris, stress index, excitement degree, fatigue degree, or smell or may include other various body information and emotional information.

The terminal device information may be the cell phone number or service carrier information, as, e.g., information regarding the terminal itself and may add information measurable on the terminal. The information measurable on the terminal includes sensing information measured by the GPS, acceleration sensor, or illuminance sensor. According to an embodiment, the app list customizing unit 140 may determine the user's personalized information from the sensing information and configure a customized app list using the determined personalized information.

Lastly, the user's app usage pattern refers to providing an app recommended by considering the usage pattern for apps which the user primarily used before, in light of the invention's goal of providing, in a simplified manner, a deep link along with an app which the user is highly likely to use in connection with the message. Here, the user may encompass both the sender, who is the generator of the message, and the recipient.

The ranking unit 150 may re-adjust the order of the app list 51 which has been generated by the app list configuring unit 130 and reconfigured by the app list customizing unit 140. As set forth above, the app list providing method of the present invention presumes securing user convenience for wearable devices or other small-display devices.

That is, the method is intended for devices unable to simultaneously display the entire list of all the apps to the user, thus resulting in the need for a choice of the one most appropriate for the current context from among several apps. To that end, the ranking unit 150 may impart predetermined grades to the apps depending on the degree of correlation between the apps and the current conversation text, sort only a few apps with higher grades, and provide the user with a list thereof.

Further, the ranking unit 150 may readjust the ranks by clustering the list of apps generated by the app list configuring unit 130 depending on similarity. For example, the ranking unit 150 may group Google map, Naver map, and Daum map, among apps searched as related to <location>, into a "map app" cluster, and com.mangoplate, com.diningcode, and com.kakao.kakaoplace into a "must-eat restaurant app" cluster and provide the same to the user.

In this case, user convenience may be further enhanced by placing tabs at the top of the app list on the user interface (UI), e.g., a tap for viewing map apps and a tap for viewing must-eat restaurant apps and providing recommended apps per cluster, as compared with merely listing recommended apps.

The deep link generating unit 160 may generate a deep link to enable direct linking to a particular page of the recommended app in the app list 51 readjusted by the ranking unit 150. Deep link means the address of a direct link to a page where a particular function may be performed on the mobile app, akin to URL address used on normal PC web browsers. That is, the deep link generating unit 160 may produce a deep link that directly leads to a page where a particular function may be performed on each app in the app list 51.

For example, if "Let's eat Andong jjimdak" is entered, and a "delivery app" related to "Andong jjimdak" is recommendable, then the deep link generating unit 160 may generate a deep link for directly leading to a page listing stores for ordering "Andong jjimdak" in the "delivery app." The user, after running the app, may be directly led from the deep link generated by the deep link generating unit 160 to the page listing their desired search result even without additional entry, and this way may be well suited for small-screen smart devices, e.g., wearable devices.

In other words, rather than merely providing the user with the app list 51 related to the text of the message, the service indeed related to the text of the message may immediately be put to use by a single touch by generating, in the icon of the app, the deep link for menu in order to enable immediate use of the related service in the app.

The app list providing device 100 may combine the app list 51 in which the deep link has been generated by the deep link generating unit 160 with the conversation text sent from the first device 10 and sends the combination to the second device 50. For example, the message sent from the first device 10 is shown on an upper portion and relevant app icons may be shown on a lower portion as illustrated in FIG. 2. Thus, user convenience may be secured. Of course, the icons have the deep link embedded therein, in order to take the user to the service related to the message text in the app.

Or, the app list providing device 100 may produce a single message by combining the app list 51 with the conversation text. That is, the app list 51 may be provided to the user in such a manner that the relevant app icons are arrayed under the message as illustrated in FIG. 2, or the list of recommended apps may be embedded in the message in the form of a combination of the text and the URL. Here, the app list providing device 100 may transform the deep link URL into a shrunken temporary address and provide the temporary address to the user.

The second device 50 may display, on the screen, the conversation from the first device 10, which is received by the app list providing device 100. At this time, the second device 50 may display the deep link, which has been sent by the app list providing device 100, as an icon array 51 along with displaying the message. The icon array 51 may list and display the icons corresponding to the associated app list which has been sent from the app list providing device 100. Without being limited thereto, however, the second device 50 may receive the deep link as a simplified link address contained in the text message, e.g., an address converted by the Google link address converter.

According to an embodiment of the present invention, the app list 51 may be displayed in other various ways for enhancing user convenience. This is described below in connection with FIGS. 21 to 34.

Described above in connection with FIG. 2 is the app list providing device 100 that hooks a message while the message is transmitted from the first device 10 to the second device 50, adds a list of apps related to the message to the original message, and sends the list-added message. According to an embodiment of the present invention, however, the app list providing device 100 is not limited to conducting such in real-time.

This may occasionally apply to text previously generated and stored. For example, assume a scenario case in which a particular user reads a review for a particular product shown on a blog on a mobile device. In this case, according to an embodiment of the present invention, the app list providing device 100 may analyze the blog posting and provide as an app recommendation, under the text of the blog, a shopping app with an embedded deep link to enable the immediate purchase of the particular product.

Further, although the app list providing device has been described in connection with FIG. 2 as a separate device from the first device 10 and/or the second device 50, the functions of the app list providing device 100 may also be implemented on each device 10 and 50. A detailed description of the instant embodiment is given below with reference to FIG. 20. Although the app list providing device 100 is described below as a kind of server device unless stated otherwise, it is not limited thereto.

The overview of the app list providing device 100 has been set forth above in connection with FIG. 2 and an embodiment of the present invention. Operations of the app list providing device 100 are now described in further detail with reference to FIG. 3 and FIG. 4.

Figure 3:
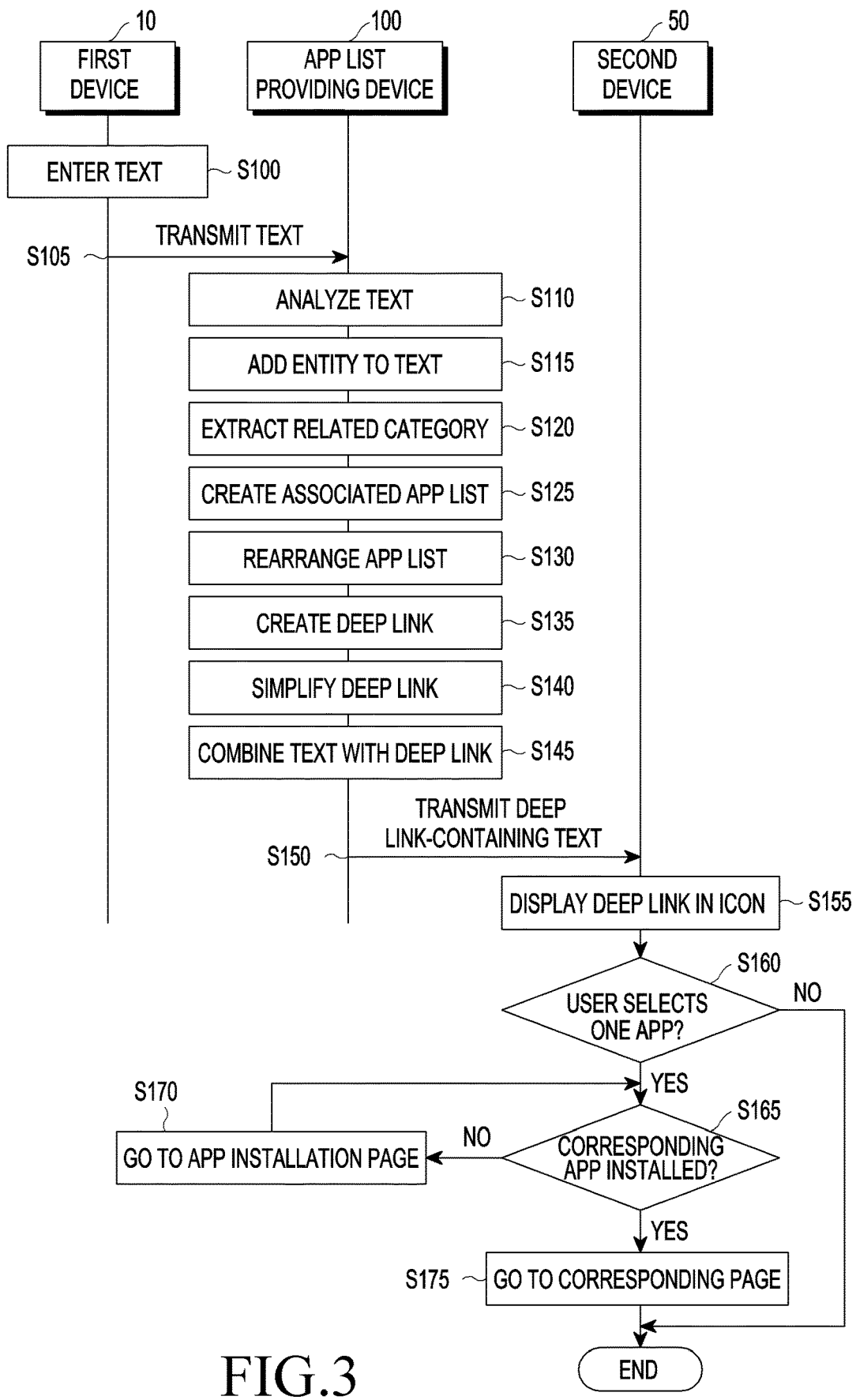
FIG. 3 is a signal flowchart illustrating an app list providing system according to an embodiment of the present invention.
Figure 4:
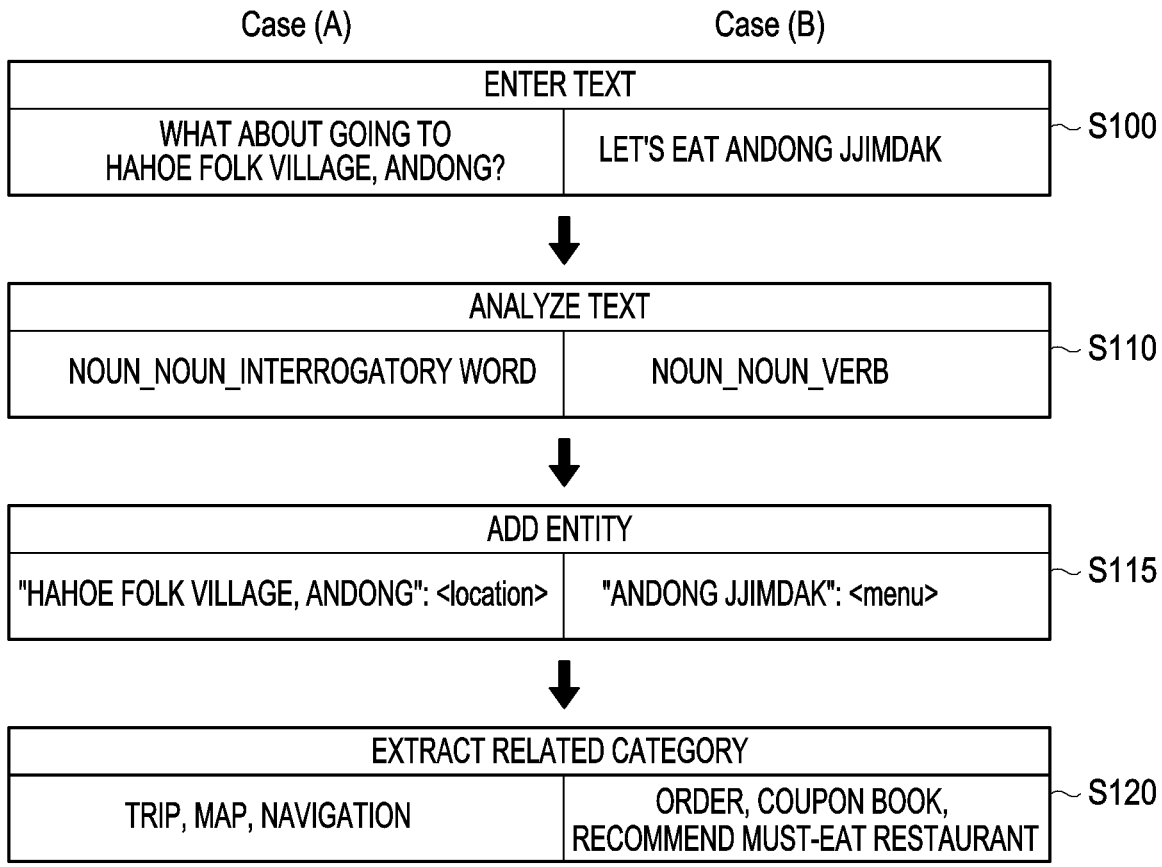
FIG. 4 is a view illustrating a process in which messages are processed according to the signal flowchart of FIG. 5.

FIG. 3 is a signal flowchart illustrating an app list providing system according to an embodiment of the present invention. FIG. 4 illustrates an example of a process in which a text-type message is processed according to the signal flowchart of FIG. 3. Now described with reference to FIGS. 3 and 4 are operations of an app list providing system according to an embodiment of the present invention.

Referring to FIG. 3, the first device 10 receives a text entered by the user through the input window (S100). Next, the first device 10 transmits the text entered by the user through the network 30 to the app list providing device 100 (S105).

The app list providing device 100 may gather the text, which has been received by the first device 10, through the data gathering unit 110 and may analyze the text by the data pre-treatment unit 120 (S110).

For example, the operational process by the app list providing device 100 is described for two separate cases: Case A, in which the text (S100) entered by the first device 10 is "What about going to Hahoe Folk Village, Andong?", and Case B, in which the text is "Let's eat Andong jjimdak." In the text analysis step S110, the data pre-treatment unit 120 may include the process of tagging a word class to the text gathered by the data gathering unit 110.

The data pre-treatment unit 120, after tagging the word class to the text, may grasp whether the nouns include a predesignated particular keyword or word, and if so, adds an entity related thereto (S115).

When the geographical term "Hahoe Folk Village" comes after the noun "Andong," the data pre-treatment unit 120 may impart and match the entity <location> to "Hahoe Folk Village, Andong." When the food name "jjimdak" follows the noun "Andong," the data pre-treatment unit 120 may impart and match the entity <menu> to "Andong jjimdak."

As such, "Andong," despite being a geographical term, may have different entities depending on the following nouns. At this time, to assign a proper entity, the named-entity recognition algorithm may come in use. Since the named-entity recognition algorithm uses grammar-based and statistics-based matching interchangeably with, but without being limited to, dictionary-based matching, not only is the entity <location> assigned to the word, but as is often case, the entity <menu> may be assigned to the word as well.

The category may be extracted based on a particular word or keyword (S120). As categories associated with the entity <location>, trip, map, and navigation may be taken into consideration. Conversely, order, coupon book, and restaurant recommendation may be taken as examples of categories associated with the entity <menu>. Extracting a relevant category (S120) may be performed by the app list configuring unit 130. In order to match the category associated with the entity, a learning model-based update scheme may be used.

The app list configuring unit 130 may estimate the category associated with the entity, receive the app associated with the category from the app list DB (not shown), and transfer the app to the ranking unit 150. The ranking unit 150, after generating an associated app list (S125), may rearrange the app list in descending order of the user's access or download count (S130), but without being limited thereto, the app list may be rearranged according to various references.

The deep link generating unit 160 may produce a deep link that allows for a direct link to a particular page in the category-related app (S135). The deep link generating unit 160 may convert the address for the produced deep link into a simplified address (S140). The deep link generating unit 160 may combine the text and the simplified address of the deep link into a single message (S145). The app list providing device 100 may transmit the deep link-containing text to the second device 50 (S150).

The second device 50, upon receiving a selection input to select one of the app lists from the user (S160), and if the corresponding app has already been installed (S165), may be led to a particular page of the selected app (S175). Here, the particular page is the page accessed via the deep link, which allows for direct use of the relevant service fitting the conversation text.

Unless the selected app has been installed on the second device 50, the user may be taken to the page for installing the selected app (S170). If the selected app is done for installation, then the user may be taken to the particular page of the selected app (S175). That is, among the apps on the app list, ones not installed on the second device 50 may be provided with deep links that contain paths for installation.

Each component of the app list providing device 100 shown in FIG. 2 may mean software or hardware, such as FPGA or ASIC. However, the components are not limited as software or hardware, but may instead be configured to be stored in a storage medium or to execute one or more processors. The functions of the components may be implemented by subcomponents into which the components are further divided, and the plurality of components may be combined into a single component to perform particular functions.

By using the app list providing device 100, according to an embodiment of the present invention, as set forth above in connection with FIGS. 2 to 4, the user who receives a message may be served apps, which the user is likely to use in relation to the message, earlier than other apps, and rather than simply providing an app list with icons, deep links may be provided which allow for direct access to the menu most relevant to the conversation text in the app fitting the conversation text, thereby enhancing user convenience.

The aspect of the app list providing device 100 that plays a role as a server has been described above in connection with FIGS. 2 to 4. For a better understanding of the present invention, another aspect of the app list providing device 100 as a client is described below with reference to embodiments of the present invention.

Figure 5:
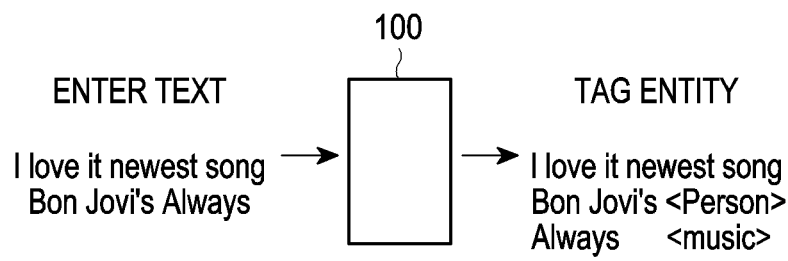
FIG. 5 is a view illustrating a process for tagging an entity to an input text by an app list providing device 100.
Figure 6:
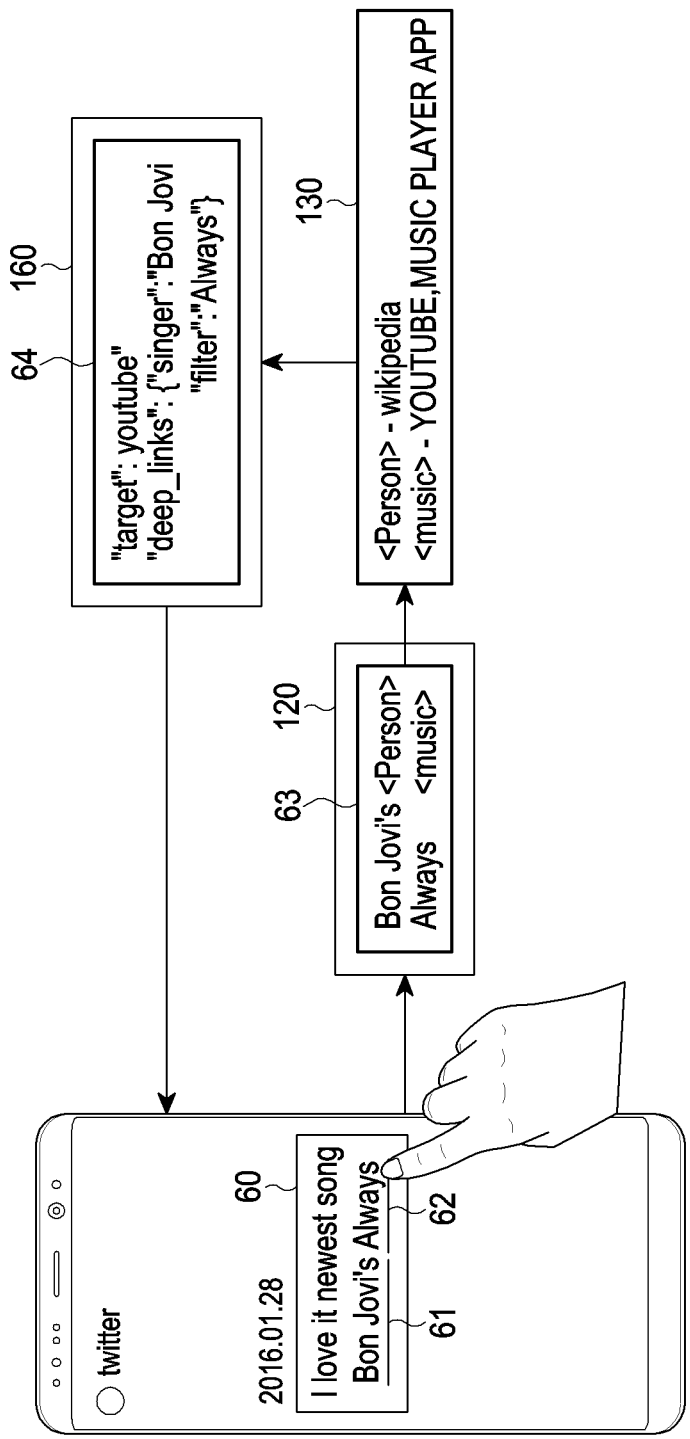
FIG. 6 is a view illustrating an operation where the entity-tagged text shown in FIG. 5 is selected by a user.
Figure 7:
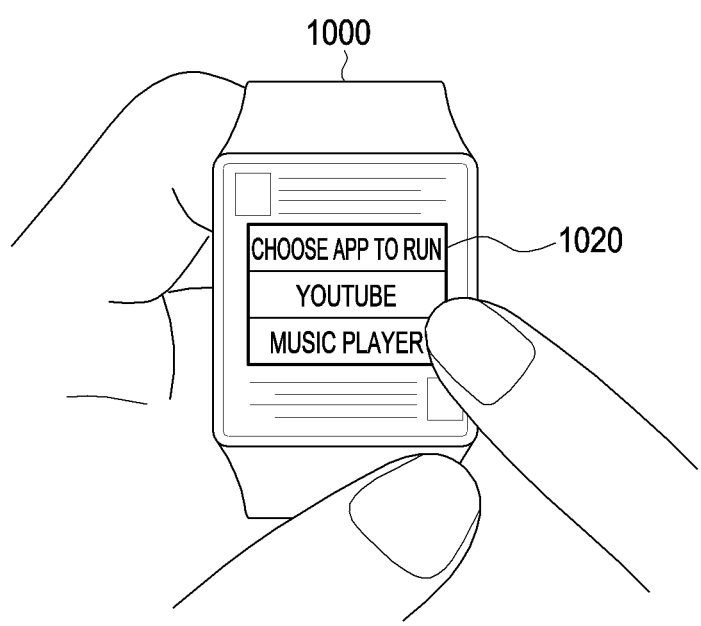
FIG. 7 is a view illustrating an example of an app list provided as a user selects the text shown in FIG. 6.

FIG. 5 illustrates an example in which the app list providing device 100 tags an entity to a text entered by the user. FIG. 6 illustrates operations related to the case in which the entity-tagged text of FIG. 5 is selected by the user. FIG. 7 is a view illustrating an example of an app list provided as a user selects the text shown in FIG. 6.

An app list providing method, according to an embodiment of the present invention, is described from the point of view of a device 100 with reference to FIGS. 5 to 7.

The app list providing method may include a data gathering step, a data pre-processing step, an app list configuring step, an app list customizing step, a ranking step, and a deep link generating step.

The data gathering step may gather text data entered by the user of the device 1000. Referring to FIG. 5, when the user enters "I love it newest song Bon Jovi's Always," the data gathering unit 110 may gather the text "I love it newest song Bon Jovi's Always."

The data pre-processing step may tag entities to the text gathered by the data gathering unit 110. The data pretreatment unit 120 may perform entity-tagging like "I love it newest song Bon Jovi's<person> Always<music>."

The keywords entity-tagged by the data pre-processing step may recommend apps fitting the user's intention, i.e., apps appropriate for the user, by the app list configuring step, app list customizing step, and ranking step.

The app list configuring unit 130, the app list customizing unit 140, and the ranking unit 150 may select the highest-ranked one from among the apps of the same category. When there are apps belonging to different categories, they may configure an app list with the respective top-ranking apps of the different categories.

Each top-ranking app on the list configured may be selected based on the user information and context information from among the apps of the same category, and they may be sequentially sorted and displayed in order of rank. At this time, the personalized information and the context information may include, but is not limited to, the user's schedule information (e.g., schedule information on the Google Calendar interface), GPS coordinates information, user profile information (e.g., age range or gender), biometric information sensed by the biometric sensor of the device, and emotional information inferred from the biometric information.

The app list and deep link generated thus may be provided to the user device as in the example illustrated in FIG. 6. The sequential sorting and displaying on the display device may be done based on the point/position of the user's touch on the display device immediately before the app list is displayed, thereby leading the user to quickly approach the top-ranking app.

Upon displaying the so-configured app list, the app link may be displayed differently depending on the type of link containing the keyword and the image representing the app. For example, if an indication of the deep link may be made when there is an app, an indication requiring an app to be installed unless present may be included, and when a link to the webpage is made, it may serve to indicate that it is a web link.

Major message keywords used in the apps provided on the recommended list may be displayed to the user in such a manner as to differentiate between each other when the message is shown (e.g., in bold or color). Such user interface (UI) is described below in greater detail with reference to FIGS. 15 and 22 to 35.

Referring to FIG. 6, an example is shown of analyzing the text 60 entered on Twitter by the user on Jan. 28, 2016 and recommending related apps. That is, the user's entered text is analyzed, and the keywords 63 are extracted. Among the extracted keywords, "Bon Jovi" 61 has the entity <person>, and its related app has a deep link generated therein to enable the use of Wikipedia, which is then provided to the user. Next, "Always" 62 has the entity <music>, and its related app has a deep link generated therein to allow for the use of YouTube or a music player app and is served to the user.

The deep link 64 is a specific example of a deep link to make YouTube available. In other words, the target is "YouTube," and if this is selected, a deep link is generated to allow for direct access to the results of a search done with the singer "Bon Jovi" and the filter "Always" and is given to the user.

If the user chooses the entity-tagged keyword, an app list related to the keyword is displayed under the keyword. That is, if "Bon Jovi" 61 is selected, the icon of Wikipedia is displayed thereunder, and if "Always" 62 is selected, the icon of YouTube or for a music player app is displayed thereunder.

Namely, the user device 1000 sends the text to the server, and as a result, receives an app list related to the text and provides the same to the user. If the user chooses and runs one of the app icons displayed on the app list, then the deep-linked app is executed, directing the user to the related menu and availing himself of service even without any additional entry.

Referring to FIG. 7, an example is shown in which an app list is displayed on the user device 1000 which is implemented as a small-display wearable device. When the user selects "Always" 62 as illustrated in FIG. 7, apps executable in relation to the entity tagged to "Always" 62 are listed, and a running app selection window (1020) is then displayed. If the user selects any one from the app list displayed on the running app selection window 1020, the input of selection is received and the service is provided.

In other words, in relation to the entity <Music> tagged to Always 62, the respective top-ranking apps, YouTube and music player, of the music video category and the listen-to-music category may be selected, and the running app selection window 1020 may be configured for such selection.

As such, the automated analysis and providing of apps related to the message allow the user to easily use the service even on a small-display client 1000 as shown in FIG. 7. In particular, the user may be automatically linked to the YouTube page where the music video "Always" by "Bon Jovi" has been searched and may play the music video on YouTube without the need to search YouTube for "Always" of "Bon Jovi" after opening YouTube to view the music video, thus experiencing maximized user convenience.

The app list providing device 100 according to an embodiment of the present invention has been described above both generally and specifically. Described next are the details of each component in the app list providing device 100. Specifically, the named-entity recognition algorithm used in the data gathering unit 110 and the data pre-treatment unit 120 are described.

Figure 8:
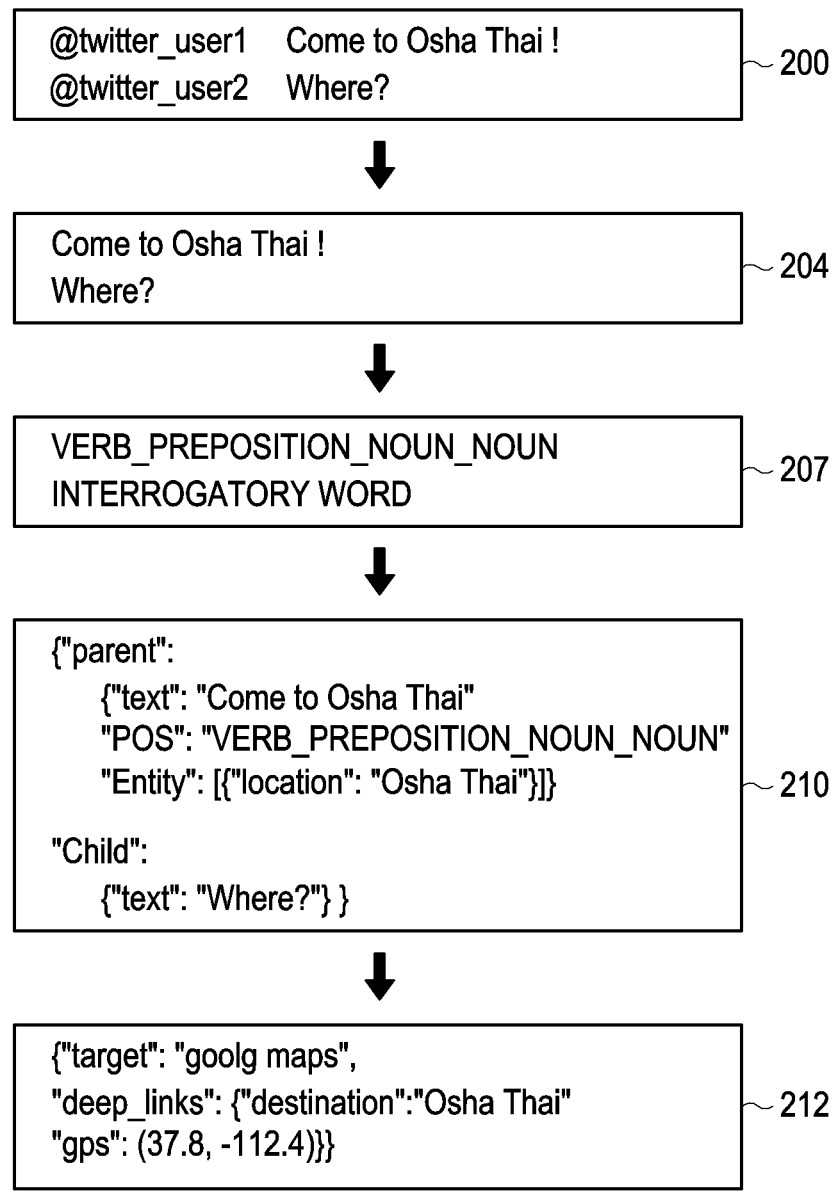
FIG. 8 is a view illustrating an example of a pre-treatment process of an app list providing device 100 according to an embodiment of the present invention.
Figure 9:
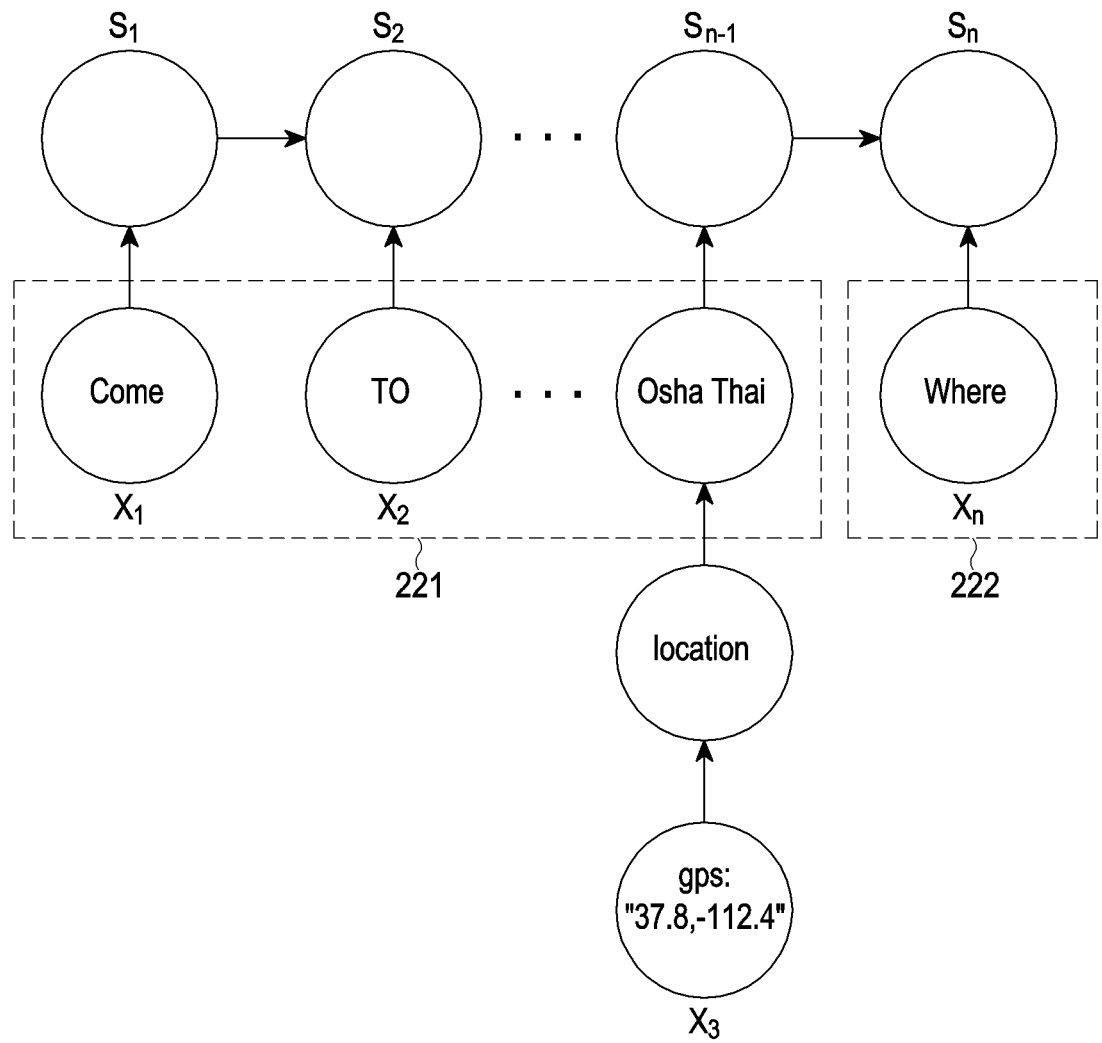
FIG. 9 is a view illustrating an example of a process for grouping conversation pair data into a single piece of conversation information.

FIG. 8 is a view illustrating an example of a pre-treatment process of an app list providing device 100 according to an embodiment of the present invention. FIG. 9 is a view illustrating an example of a process for grouping conversation pair data into a single piece of conversation information.

The data gathering unit 110 of the app list providing device 100 may gather data of conversation pairs exchanged on an SNS. The data gathering unit 110 may gather conversation pairs, but not a single unilateral sentence. Of a conversation pair, one sentence and the other may respectively be represented and stored as a parent and a child.

The data pre-treatment unit 120 may split the conversation pair data gathered by the data gathering unit 110 in token units, remove noise, extract keywords to which entities may be assigned, and impart entities. The data pre-treatment unit 120, prior to adding the entity to the keyword, may use the named-entity recognition algorithm.

In a pre-treatment process for conversation pair data, the data pre-treatment unit 120 may extract the entity associated with the keyword and tag meta information. The operations of the data gathering unit 110 and the data pre-treatment unit 120 and the named-entity recognition algorithm are described below in detail with reference to FIG. 8.

When there is a sentence containing the predesignated, particular keyword "Osha Thai," the data gathering unit 110 may gather, as a single piece of conversation pair data 200, the sentence "Come to Osha Thai!" and the sentence "Where."

The data pre-treatment unit 120 may remove noise, e.g., emoticons or symbols, from the conversation pair data 200 gathered by the data gathering unit 110. The data pre-treatment unit 120 may convert the conversation pair data 200 into conversation pair data 204 by splitting the conversation pair data 200 into token units. The data pre-treatment unit 120 may convert the conversation pair data 204 into conversation pair data 207 by tagging word classes to the conversation pair data 204.

In a pre-treatment process for conversation pair data, the data pre-treatment unit 120 may extract words to which entities may be assigned and produce entity-added conversation pair data 210. The data pre-treatment unit 120 may include tagging meta information to the entity-added words (212).

A specific example is described with reference to FIG. 8. when a conversation pair on the SNS between User1 and User2 contains the predesignated keyword "Osha Thai," the data gathering unit 110 may gather the sentence "Come to Osha Thai" and the sentence "Where" into a pair of conversation pair data 200.

The data pre-treatment unit 120 may receive the conversation pair data 200 gathered by the data gathering unit 110 and produce conversation pair data 204 free from "@twitter_user1" and "@twitter_user2."

The data pre-treatment unit 120 may split each of the sentences 205 and 206 contained in the noise-removed conversation pair data 204 in token units. Thus, the first sentence 205 contained in the noise-removed conversation pair data 204 may be split into "Come," "To," "Osha," and "Thai."

The data pre-treatment unit 120 may produce the conversation pair data 207 by tagging word classes (POS) to the conversation pair data 204. Since "Come" is a verb, "To" is a preposition, "Osha" is a noun, "Thai" is a noun, and "Where" is an interrogative word, the data pre-treatment unit 120 may generate the word class-tagged conversation pair data 207 from the conversation pair data 204.

The data pre-treatment unit 120 may produce the finally pre-processed conversation pair data 210 from the word class-tagged conversation pair data 207. The conversation pair data may divide the sentences into a parent (sentence) and a child (sentence), thereby producing the finally pre-processed conversation pair data 210. At this time, an entity may be assigned to the predesignated keyword "Osha Thai." Since "Osha Thai" is a restaurant name, the entity may be "location," but is not limited thereto.

The data pre-treatment unit 120 may add location information "GPS" (37.9, −112.4) to the entity-assigned keyword "Osha Thai." (212)

Referring to FIG. 9, a data tree where meta information and entity information has been mapped may be generated using the conversation pair data 210 pre-processed by the data pre-treatment unit 120.

The entity information indicating that "Osha Thai" is a location and the GPS information may be generated as a single coupling list. At this time, after coupling the conversation pair of the first sentence "Come to Osha Thai" and the second sentence into a single piece of data, the entity information and meta information about the keyword "Osha Thai" may be added as an "Osha Thai" child node.

Figure 16:
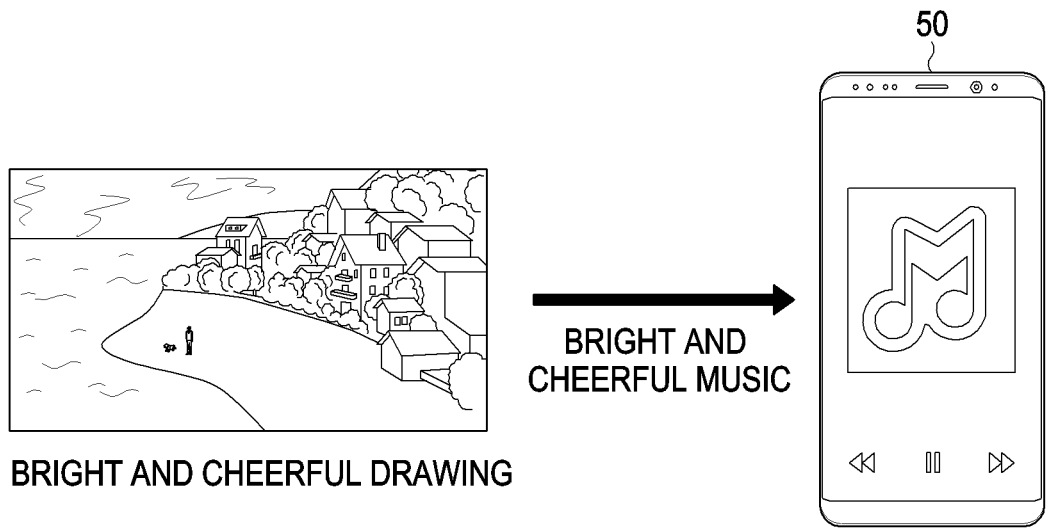
FIG. 16 is a view illustrating an example of a method for providing an app list based on a message containing a different type of content from text referenceable in some embodiments of the present invention.

Further, the entity information which the data pre-treatment unit 120 reflects to configure a deep link is not limited to text, but may instead adopt multimedia data, such as image, music, or map, used to suggest a reply. For example, the meaning of the image used as a reply as shown in FIG. 16 may be recognized and a deep link may be recommended. Further, the form of suggesting a replay contains the user's voice input information as well as text.

Further, if the conversation pair data is stored in association with the entity information and meta information following the contextual flow for the conversation pair data as shown in FIG. 9, the information may be provided to the ranking unit 150, thus affecting the grade of association.

There has been described thus far, in connection with FIGS. 8 and 9, the process in which the data gathering unit 110 and the diversity unit analyze a message and tag its entities. This is based on natural language processing, and message analysis and entity tagging may be repeated by machine learning. In particular, since words spelled the same may differ in meaning depending on context, the accuracy may be enhanced by machine learning.

Next, the app list configuring unit 130 and app list customizing unit 140 of the app list providing device 100 are described in greater detail. The app list configuring unit 130 and the app list customizing unit 140 play a role in providing an app list related to keywords whose meaning has been figured out by natural language processing.

The app list configuring unit 130 may look up the app list DB for apps associated with the data pre-processed based on the final, pre-processed conversation pair data 210. The app list DB stores a list of apps associated with the pre-processed data.

All or some of the apps associated with the pre-processed data may be candidate apps which may be provided in the course of conversation. Specifically, although the apps associated with the pre-processed data are related to entity-added keywords, the highest associated one among the candidate apps may be determined by the keywords having additional entities contained in the conversation pair data.

The app list customizing unit 140 may filter the candidate apps, which have been looked up on the app list DB and generated by the app list configuring unit 130, only obtaining apps more appropriate for the user.

That is, the app list customizing unit 140 configures an app list based on the text of the message and then reconfigures the same using the user's ambient environment and past history. For example, the app list customizing unit 140 may provide a further customized app list by way of, e.g., the user's interest, past history of app use, or resultant values of individual apps.

Referring to FIG. 9, in relation to "Osha Thai," the entity <location> has been tagged, and GPS information has been obtained as detailed information. It is assumed that a public transportation notification app, a navigation app, and a map app are searched from the app list DB as apps related to <location>. In this case, the app list configuring unit 130 may select them as candidate apps as a result of the search.

The public transportation notification app provides public transportation information and arrival notification information, and the navigation app provides routes when the user is driving. The map app provides the location information about the restaurant "Osha Thai" on the map, through, e.g., Google maps. Here, providing the navigation app is inappropriate for users who frequently use the public transportation notification.

To address such issue, it is required to provide the app list considering not only the contextual flow of conversation pair data but also the user's app usage pattern. This may be fulfilled by the app list customizing unit 140. That is, the app list customizing unit 140 performs first filtering on the app list, which has been searched on the app list DB and generated by the app list configuring unit 130, considering, e.g., the user's usage pattern, personal information, and device information, thereby reconfiguring the app list into one more appropriate for the user.

The ranking unit 150 and deep link generating unit 160 of the app list providing device 100 are described below. The ranking unit 150 may impart a relevance grade to each executable app of the app list first filtered by the app list customizing unit 140 so as to recommend the app most appropriate for the user's usage pattern.

The ranking unit 150 may perform such grading per app. Specifically, the ranking unit 150 may assign a grade to each app based on conversation information and the user's usage pattern. The ranking unit 150 may select the app with the top grade.

The ranking unit 150 may select one from among executable apps by grading and provides information about the selected app to the deep link generating unit 160. The deep link generating unit 160 may generate a deep link to go to a particular page of the selected app. Deep link means a link to directly go to a particular page in a mobile app, like the URL on Internet Explorer.

At this time, the information about the particular page in the app may discriminately be determined based on the conversation information and usage pattern. Further, as the information about the particular page in the app is determined based on the conversation user information and context information extracted from the conversation information, different configurations of apps may be arrayed/displayed even when the user enters the same text information, or although the same app configuration is provided, the particular page to be linked may be varied depending on the user information and context information.

The deep link generating unit 160 may allow for direct linking to the page related to the keyword, e.g., "Osha Thai," used in selecting app by the ranking unit 150, using the keyword. For example, the public transportation notification app may generate a deep link to a service to notify the user of notification from the departure point, i.e., the current location, to the destination, i.e., "Osha Thai," and the navigation app may generate a deep link to a service to provide directions from the departure point, i.e., the current location, to the destination, i.e., "Osha Thai."

The deep link is described in more detail. Deep link means a protocol capable of transferring particular values to the respective particular pages of different apps. For example, the web URL "http://map.naver.com/local/siteview.nhn?code=19585783" is a link regarding a particular location on the Naver map website.

A web URL typically has a prefix, such as "http://" or "https://". Likewise, mobile applications may provide service through their respective prefixes. For example, YouTube has the prefix "youtube://," Melon "meloniphone://," and Bugs "bugs3://."

To run the Naver app on a mobile application to provide a particular service, such a deep link as "naversearchapp://command?parameter=option&version=version" may be generated and provided to the user referring to "http://developer.naver.com/wiki/pages/UrlScheme." Other mobile applications also offer guidance as to how to generate a deep link starting with a particular prefix in a similar manner.

The deep link DB is a database that stores protocols to generate deep links per mobile application. In other words, prefixes, variables, or the like to generate deep links may previously be built up into a deep link DB. The deep link generating unit 160 may generate a deep link using keywords extracted from the message as parameters and provide the same to the user so that the user can immediately use service.

The data gathering unit 110, the data pre-treatment unit 120, the app list configuring unit 130, the app list customizing unit 140, the ranking unit 150, and deep link generating unit 160 may provide a list of apps with the highest relevance to the current message and a deep link to a particular service of the corresponding app along with the original message, thereby allowing the user to easily run the associated app as compared with simply delivering the message and hence leading to enhanced user experience.

Figure 10:
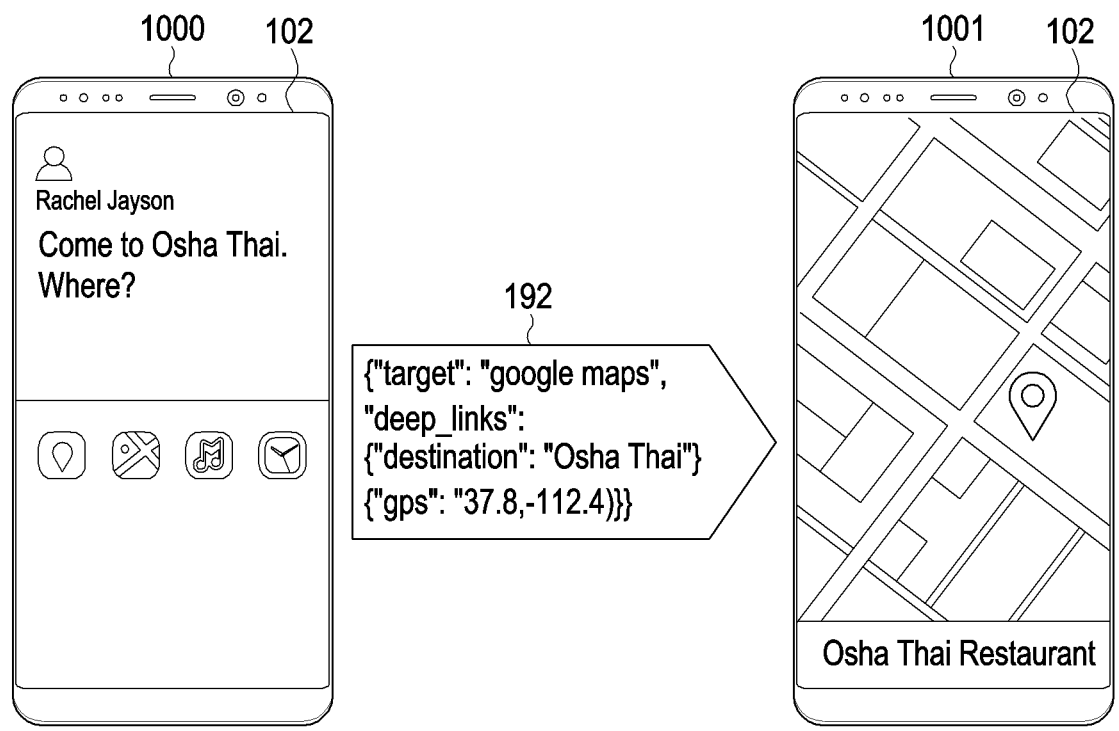
FIG. 10 is a view illustrating an example of a method for a user to transmit a deep link to the other party using an app list providing device 100 according to an embodiment of the present invention.

FIG. 10 is a view illustrating an example of a method for a user to transmit a deep link to the other party using an app list providing device 100 according to an embodiment of the present invention.

FIG. 10 illustrates a process in which a deep link is transmitted from a first device 1000 to a second device 1001 via the app list providing device 100. The app list providing device 100 may analyze a message between the first and second devices, generate an app list and a deep link, and then transmit the message, app list, and deep link to the second device 1001. The second device 1001, immediately after receiving the app list and the deep link 192, may directly run the page of the app linked via the deep link 192.

Figure 11:
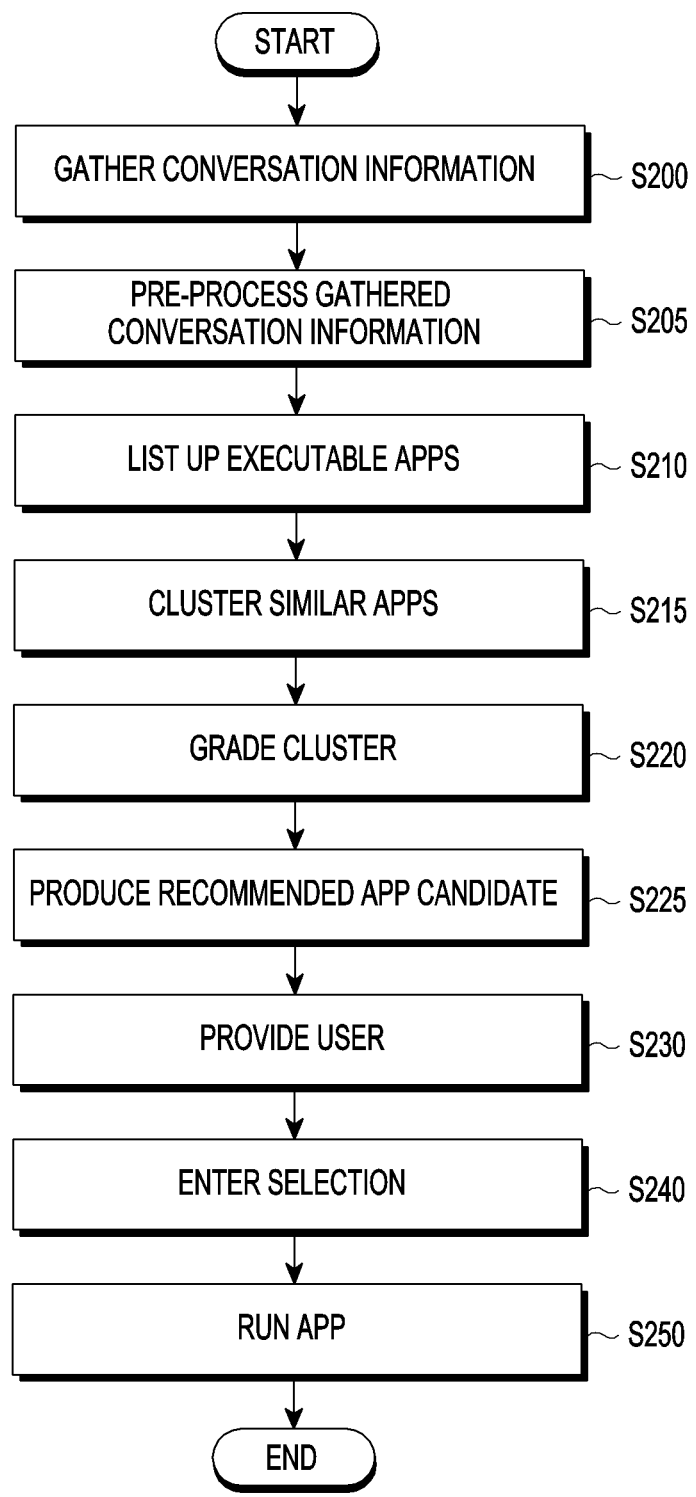
FIG. 11 is a flowchart illustrating an app list providing method according to an embodiment of the present invention.

FIG. 11 is a flowchart illustrating an app list providing method according to an embodiment of the present invention.

Referring to FIG. 11, a computing device may gather information data through a messenger or SNS (S200). The computing device may pre-process the gathered conversation information (S205).

The conversation information data pre-processing step may include removing, by the computing device, emoticons or user information on Twitter, extracting conversation information alone, splitting the conversation information into token units, and then tagging word classes to the conversation information.

The conversation information pre-processing step may also include, after tagging the gathered conversation information by the computing device, adding entities to several predesignated keywords, adding meta information for the added entities, and producing preprocessing-complete information.

The computing device may list up executable apps using the pre-processed conversation information (S210). In the step of listing executable apps, an app list DB previously established may be used. The app list DB stores app information related to particular entities. The computing device may perform clustering, which puts executable apps with similar app purposes in one cluster (S215). Clustering may be performed by the characteristics of the app or the degree of similarity in category.

The computing device may grade each cluster in light of the degree of relevance to the conversation information and assign a relevance grade to each cluster (S220). Further, the computing device may select the apps in the top-grade cluster as recommended candidate apps (S225).

The computing device may produce a plurality of apps in the top-grade cluster into a recommended app list and provide the list to the user (S230). If the user selects any one of the plurality of recommended apps in the list received and the computing device receives the selection input (S235), the computing device may run the selected app (S240).

Figure 12:
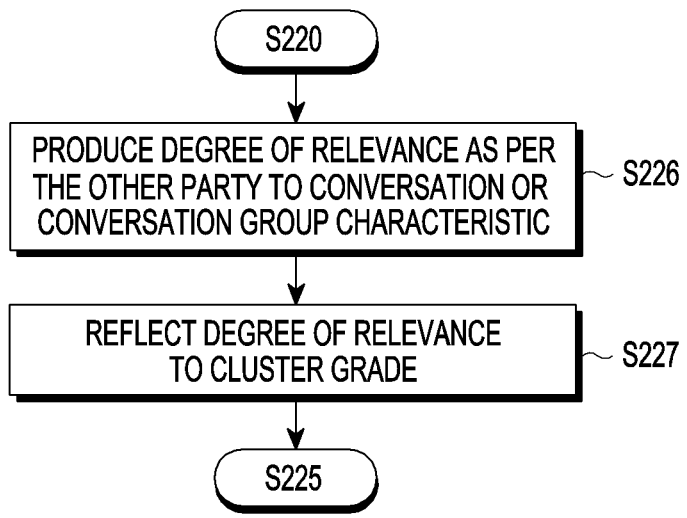
FIG. 12 is a detailed flowchart of the grading step S220 of FIG. 11.
Figure 13:
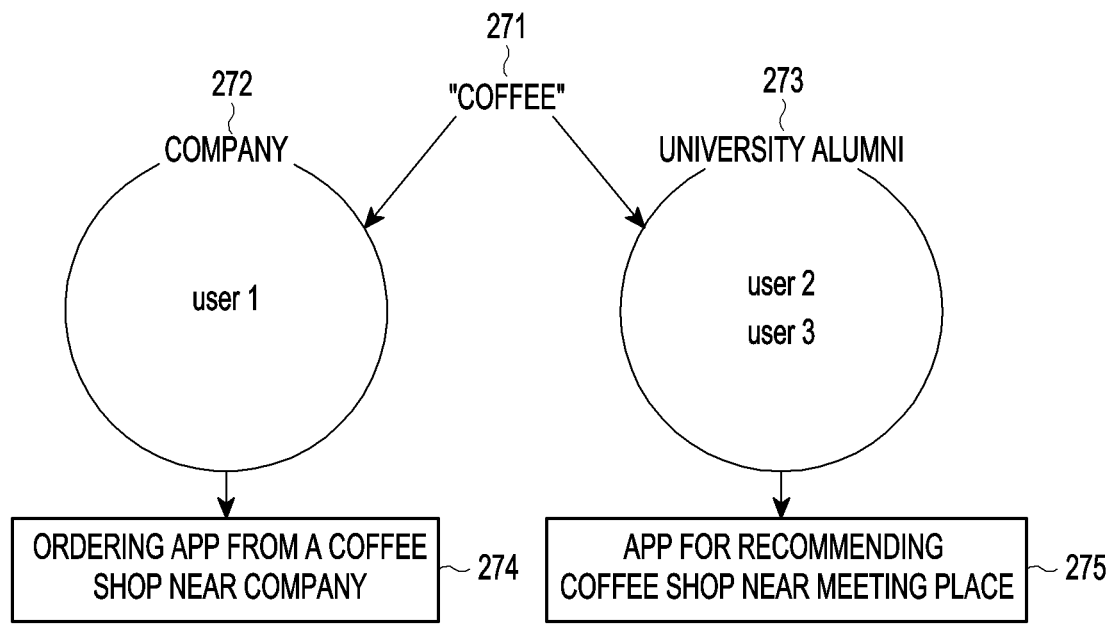
FIG. 13 is a view illustrating an example of reflecting the other party to the conversation to a clustering grade according to the steps S226 and S227 of FIG. 12.

FIG. 12 is a detailed flowchart of the grading step S220 of FIG. 13. FIG. 13 is a view illustrating an example of reflecting information about the other party of the conversation of FIG. 12 to a clustering grade.

Grading each cluster (S220) is described in detail with reference to FIG. 12. Referring to FIG. 12, cluster grading (S220) may include obtaining (S226) the degree of relevance according to the other party of the conversation on the messenger or conversation information-entered conversation group characteristic and reflecting (S227) the relevance grade regarding the other party of the conversation or conversation group characteristic to the cluster grading (S220)

Next, reflecting the other party of the conversation or conversation group characteristic to cluster grading is described in detail with reference to FIG. 13.

When the keyword "coffee" 271 is contained in the conversation information, the entity <dessert> may be assigned. At this time, when the user has the conversation with user1 in the group "company" 272, what is more appropriate for the user is to allow the entity <dessert> to recommend the user for the order app 274 from a coffee shop which is near the company and which the user frequently visits.

In contrast, when the user has the conversation with user2 or user3 in the group "university alumni" 273, different apps may be recommended albeit the same keyword "coffee" 271 is in the conversation information. In particular, since the group characteristic information may be more critical when the user has a conversation with his university alumnus 273, different relevance degree information other than a conversation partner in the company group 272 may be assigned, and an app 275 for recommending coffee shops near the gathering place may be recommended.

As such, recommended apps may be re-filtered given the user's usage pattern, personal information, and device information, as well as the text itself and context. Further, the user's reaction to the recommended app may be fed back and reflected.

Figure 14:
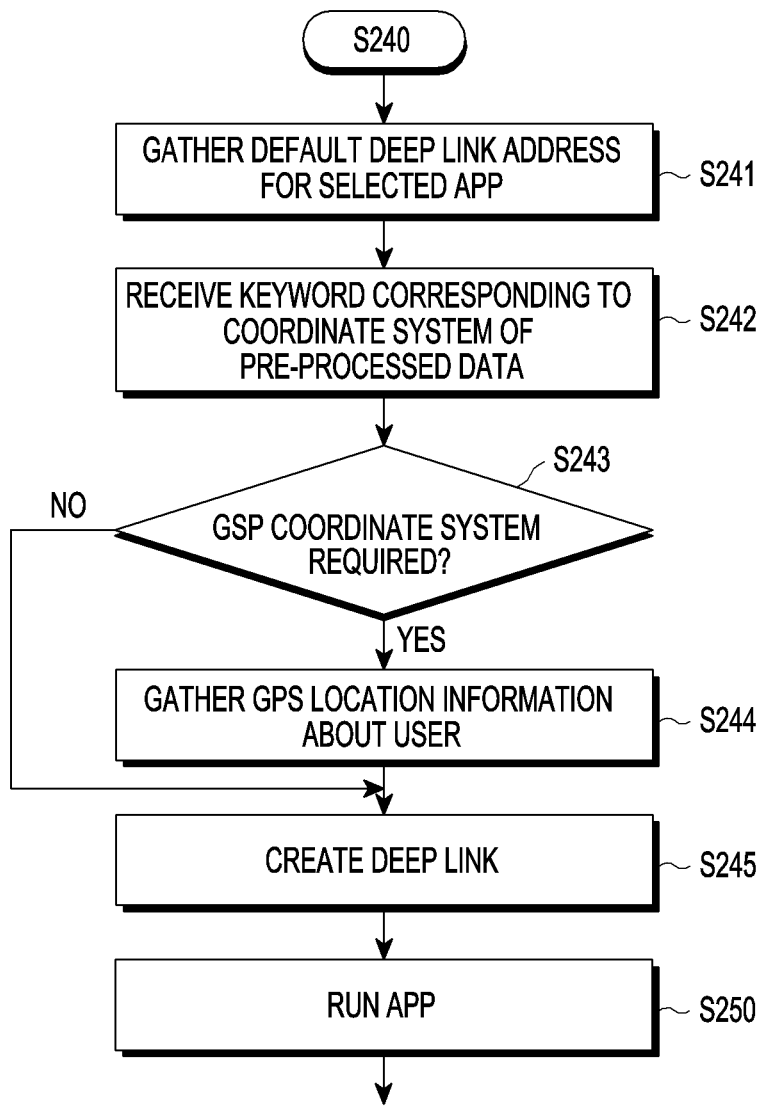
FIG. 14 is a detailed flowchart illustrating the step S250 of a user device receiving a selection input (S240) form a recommended app list from a user and executing an app.

FIG. 14 is a detailed flowchart illustrating the step S250 of a user device receiving a selection input (S240) from a recommended app list from a user and executing an app.

Referring to FIG. 14, a user device may gather a default deep link address for an app that he selects (S241). Thereafter, the user device may receive the keyword corresponding to the coordinate system of data pre-processed based on entity information and category information related to the entity information (S242), determine whether generating a deep link requires GPS coordinate system information (S253), if GPS coordinate system information is required, gather the user's GPS location information (S264) followed by generating a deep link (S245), and unless the user's GPS location information is required (S253), generate (S245) a deep link based on the received keyword (S242).

Figure 15:
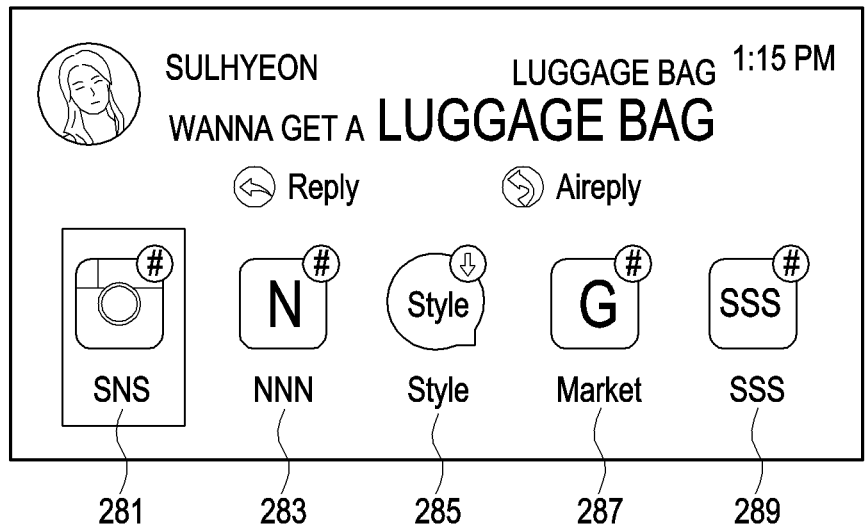
FIG. 15 is a view illustrating a user interface (UI) to provide a user with a message along with an app list and a deep link.

FIG. 15 is a view illustrating a user interface (UI) to provide a user with a message along with an app list and a deep link. The user interface of the device is briefly described here, and some embodiments regarding a method for displaying an app list are described in detail with reference to FIGS. 22 to 35.

If the message is analyzed, an app related to the message is searched, a deep link related to a particular service from the app is generated and provided along with the message by the steps of FIGS. 11 to 14, then the user device receive and display the message and deep link on the screen as shown in FIG. 15.

Referring to FIG. 15, there is shown the message "wanna get a luggage bag" sent from the other party, Sulhyeon, of the conversation. As "luggage bag" has the entity <product>, and "wanna get" is <shopping>, apps for buying product would primarily be searched as recommended apps.

Referring to FIG. 15, the user is recommended for five apps. Among them, an Instagram app 281, a Naver app 283, and a Gmarket app 285 have already been installed on the user device which has received the message and the symbol "#" on the top right end of each indicates that they have been deep-linked. Conversely, a Mango style app 285 and a Shinsegae app 289 have not been installed yet, and the download symbol "↓" is displayed on the top right end to indicate the need for installation. Hereinafter, such a symbol is referred to as a marker to indicate the entity of the app.

Thus, the user who receives the message may reply to the message via "Reply" or run the deep-linked app to select a luggage bag which Sulhyeon likely desires to have and send the link to the product page as responsive to the message.

Conventionally, upon receiving the message "wanna have a luggage bag" from Sulhyeon, the user closes the message app, runs a shopping app, searches goods for "luggage bag," selects a certain one from among them, copies the address, turns back to the message app, and sends the link to the product along with such a response message as "What about this one?"

In contrast, in case of using the app list providing method, according to an embodiment of the present invention, upon receiving the message "wanna have a luggage bag" from Sulhyeon, shopping apps are automatically listed under the message, and if the user chooses a particular one from among the apps, he may be automatically led to the page when "luggage bag" is searched on the app, thus easily picking one Sulhyeon would want.

Further, as per the app list providing method according to an embodiment of the present invention, apps related to conversation text are provided via deep links. Thus, the user may choose a luggage bag Sulhyeon might be happy with and then return to the message app, such as Kakaotalk or Line, easily resuming the conversation.

FIG. 16 is a view illustrating an example of a method for recommending a related app based on a message, not text, according to an embodiment of the present invention.

The app list providing method and device described above in connection with FIGS. 1 to 15 focus primarily on recommending related apps targeting text. During the course, the description has intensively dealt with named-entity recognition of natural language processing and deep link as enabling immediate use of a particular service that an app provides.

However, a look at Kakaotalk, Line, or other messenger apps reveals that various formats of data other than text are sent or received as messages. For example, when an image comes in as a message, the content of the image may be analyzed and related apps may be offered.

Referring to FIG. 16, there is shown an example in which the content of a drawing received from the other party is analyzed and music fitting the content of the drawing is recommended as a related app. If the drawing looks bright and cheerful, the user receiving the drawing may be recommended for an app, as the related app, capable of playing bright and rhythmical music.

As such, even upon communicating various formats of message files, but not simply text-based messages, recommended apps related thereto may be served to the user, and this way may enhance user convenience. In this process, if the target is text, a named-entity recognition algorithm may be adopted, and if images, an image analysis algorithm may be adopted.

Although the example in which images are analyzed to provide music is described in connection with FIG. 16, the present invention is not limited thereto. In some cases, it may also be possible to analyze music-containing messages. For example, when music is analyzed as a song, a keyword may be extracted from the subtitle of the song to provide its related apps. Or, in the case of a text-containing image, the text in the image may be analyzed by optical character recognition (OCR) to extract keywords.

That is, in the case of a multimedia-containing message, the multimedia may be analyzed by various analysis algorithms, such as image analysis, video analysis, sound analysis, or others, and multimedia-related keywords may further be extracted and be used to recommend the user for apps related to the message and multimedia. Use of such may allow users of not only simple text but also emoticons, images, or videos, further enhanced user convenience.

Figure 17:
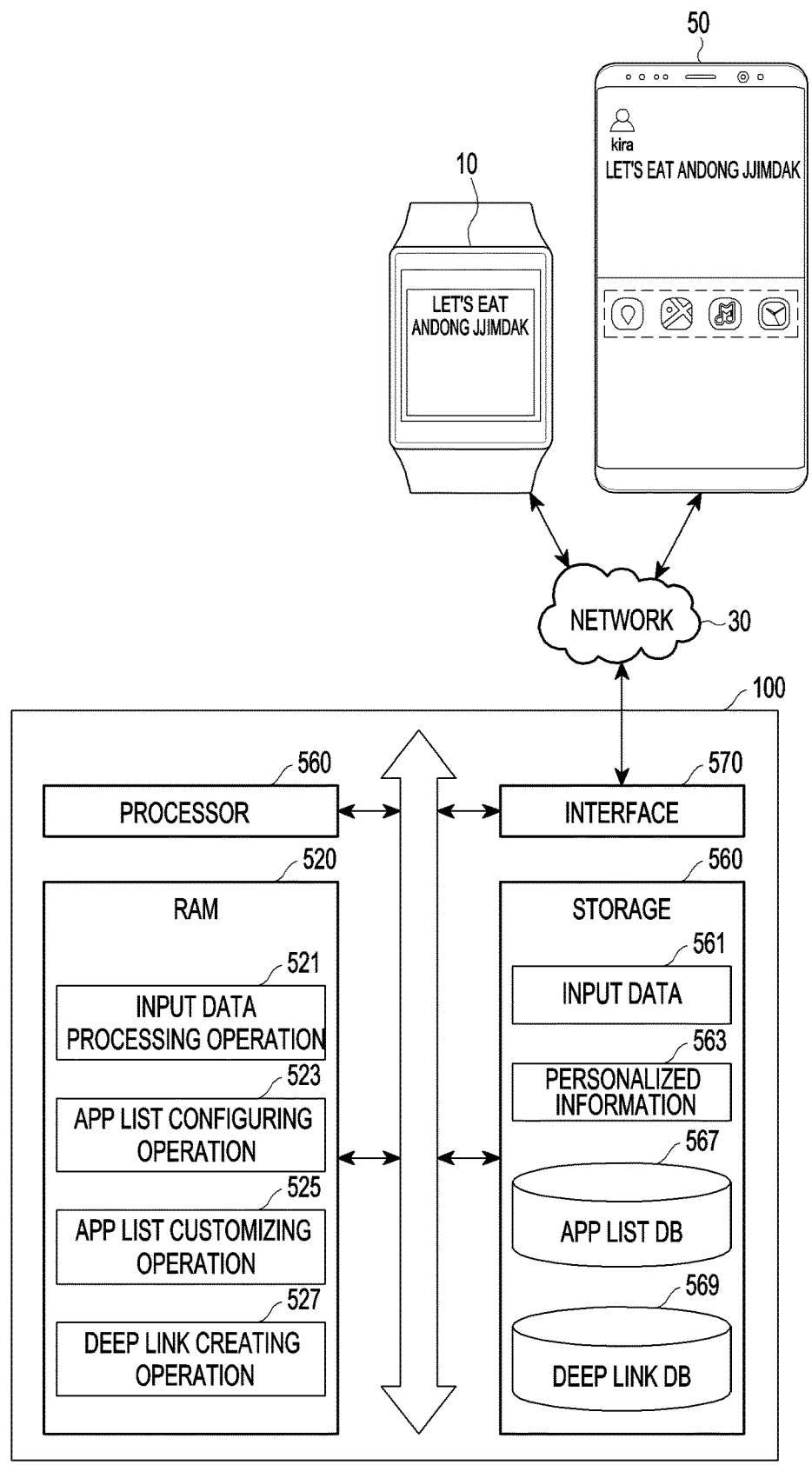
FIG. 17 is a view illustrating an example hardware configuration of an app list providing device according to an embodiment of the present invention.

FIG. 17 is a view illustrating an example hardware configuration of an app list providing device 100 according to an embodiment of the present invention.

Referring to FIG. 17, the app list providing device 100 may include one or more processors 510, a memory 520, storage 560, and an interface 570. The processor 510, the memory 520, the storage 560, and the interface 570 transmit or receive data via a system bus 550.

The processor 510 executes a computer program loaded on the memory 520, and the memory 520 loads the computer program from the storage 560. The computer program may include an input data processing operation 521, an app list configuring operation 523, an app list customizing operation 535, and a deep link generating operation 527.

The input data processing operation 521 may receive messages exchanged between the first device 10 and the second device 50 through the network 30 and store the messages as input data 561 in the storage 560. The input data processing operation 521 extracts keywords from the so-gathered data by natural language processing, analyze their meaning, and tag entities thereto.

The app list configuring operation 523 looks up the app list DB 567 with the entity-tagged keyword to search for a group of app candidates related to the keyword. Next, the app list customizing operation 525 performs first filtering on the so-searched candidate group by screening only apps more appropriate for the user using the personalized information 563.

Here, the personalized information 563 is information that is gathered in an information dictionary including the user's usage pattern, personal information, and device information and is stored in the storage 560. Also, the personalized information 563 is a value continuously updatable by the user's reaction fed back on the app list provided to the user.

The app list first-filtered based on the user's personalized information 563 may be adjusted for order of exposure by a ranking operation (not shown). The degree of relevance to the current message or the degree of relevance to the user's personalized information 563 may be numbered, and the order of exposure of the app list may be adjusted based thereon.

The germicidal lamp generating operation 527 looks up the deep link DB 569 for each app in the app list and generates a deep link to allow for direct access to a particular service of the corresponding app. As set forth above, since deep links for mobile applications have different prefixes or variables from application to application, the keyword may be transferred as a parameter by referring to the deep link DB 569 of such prefixes or variables.

Thus, a particular app related to a message or a particular service of the particular app may directly be provided to the user, and the user who receives the message may be provided an app, which he is likely to run, with a single touch, i.e., a single user input, and a service. In particular, for small-display devices, such as wearable devices, enhanced convenience may lead to users' satisfaction with services.

The app list providing system, app list providing method, and app list providing device 100, according to some embodiments of the present invention, have been described above in connection with FIGS. 2 to 17. Further, the description was made under the hypothesis that the app list providing device 100 has been assumed to operate as a sort of server device between the first device 10 and the second device 50 while focusing mainly on the logic of providing an app list. Now described are specific embodiments in which the app list providing method and/or app list providing device 100 are embodied in a user device, e.g., the device 10 or 50 and/or some embodiments of a method for providing an app list in light of a user interface.

Figure 18:
FIGS. 18 and 19 are views illustrating a user interface for displaying conversation messages referenceable in some embodiments of the present invention.
Figure 19:

FIGS. 18 and 19 are views illustrating a user interface for displaying conversation messages referenceable in some embodiments of the present invention. Specifically, FIG. 18 illustrates an example in which a conversation message includes one keyword and FIG. 19 illustrates an example in which a conversation message includes a plurality of keywords. Embodiments of the present invention are described below with reference to FIGS. 18 and 19.

First, an example interface for a conversation message window is briefly described. To display the other party of the conversation on the conversation message window, the other party's nickname or "Sulhyeon" as representing him may be displayed with his profile photo or a photo user selected shown thereby.

Further, the text of message "what about going to Vatos" may be displayed under the other party's name, and the time the message was generated, "01:15 PM", may be displayed together on the window.

Further, the user may send a message responsive to the message by the "Reply" button or may simply send a response message in such a manner as to select one from a list of response messages using a function, which the message app provides, by the "Aireply" button.

Here, assuming that the none "Vatos," which has an entity of location, of the message "what about going to Vatos" the other party has sent is selected and/or determined, "Vatos" may be processed to be differentiated from the other phrases. For example, as shown in FIG. 18, the noun may be shown in bold. Besides, the noun may be processed to be distinguished from the other non-keyword parts in various manners, e.g., displaying in a different color, contrasting, displaying in a different brightness, underlining, highlighting, or enclosing in quotation marks, but without being limited thereto.

Next, referring to FIG. 19, in the hypothesis that in the message text "Let's meet at 10 o'clock at Starbucks," the noun "Starbucks" which has an entity of location and "10 o'clock" which has an entity of time are selected and/or determined as keywords, the determined keywords may be processed, e.g., in bold or in different colors to be differentiated from the others. Here, the different keywords "Starbucks" and "10 o'clock" may also be displayed in different thicknesses, different colors, different fonts, or in other various ways to be differentiated from each other.

A configuration of an app list providing device 300, according to an embodiment of the present invention, is described below in detail with reference to FIG. 20. As described above, FIG. 20 illustrates an example in which the app list providing device 300 is embodied in a user device.

Figure 20:
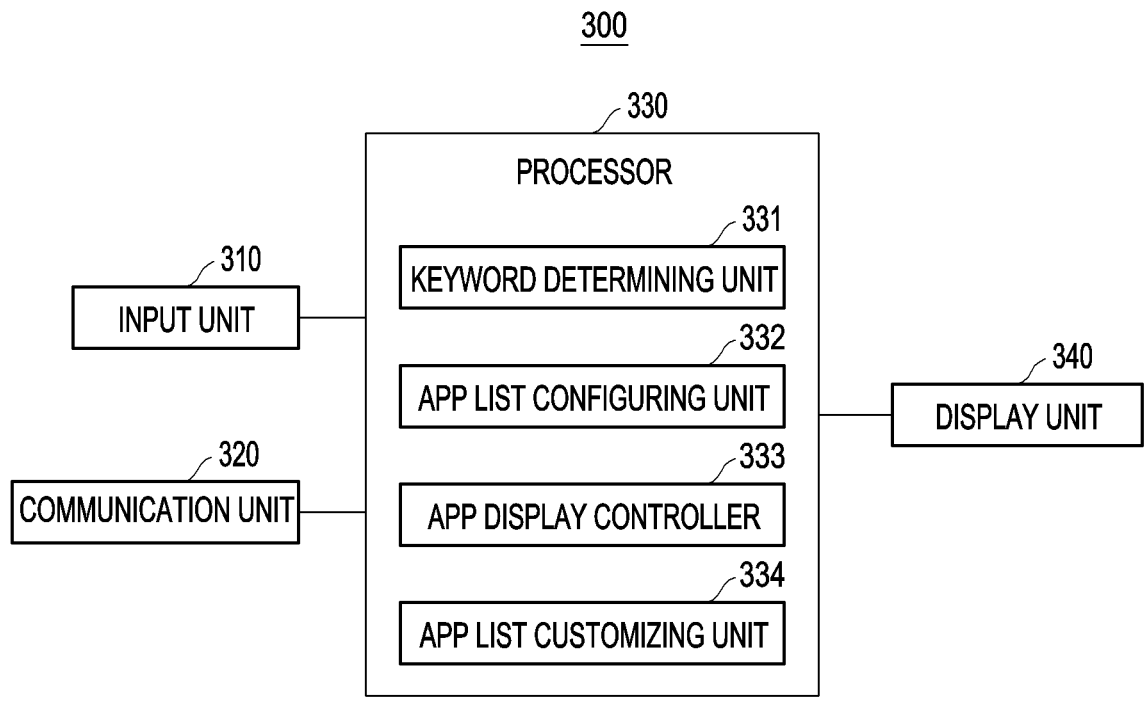
FIG. 20 is a block diagram illustrating an example of an app list providing device 300 according to an embodiment of the present invention.

Referring to FIG. 20, the app list providing device 300 may include an input unit 310, a communication unit 320, a processor 330, and a display unit 340. FIG. 20, however, illustrates only components related to embodiments of the present invention. Thus, it would be appreciated by one of ordinary skill in the art that general-purpose components other than those shown in FIG. 20 may be added. It should also be noted that the components of the device shown in FIG. 20 refer to functional elements functionally differentiated from each other, and at least one of the components may be integrated with another in an actual physical environment.

Here, the app list providing device 300 may be a terminal capable of accessing various webpages via a wired/wireless communication network and displaying the webpages under the user's control, which includes, but is not limited to, one of, e.g., smartphones, tablet computers, desktop computers, laptop computers, workstations, PDAs, portable computers, cordless phones, mobile phones, e-book readers, portable game players, navigation devices, black boxes, digital cameras, televisions, or wearable devices. Each component is described below.

The input device 310 plays a role in receiving the user's input and may be configured as at least one of a touchpad, touch panel, keypad, dome switch, physical button, jog shuttle, or sensor, but is not limited thereto.

The communication unit 320 performs data transmission/reception through at least one of wired communication or wireless communication and may be configured to support local area networks (LAN), metropolitan area networks (MAN), wide area networks (WAN), or other various communication networks, which may include at least one communication scheme including, but not limited to, LTE, WCDMA, CDMA, GSM, Wi-Fi, Bluetooth, and NFC.

The processor 330 functions to determine a keyword based on a message received and provided or entered and provided by the app list providing device 300 and determine an app list including one or more apps to display on the display unit 340 based on the determined keyword. To that end, the processor 330 may include a keyword determining unit 331, an app list configuring unit 332, an app display controller 333, and an app list customizing unit 334. Besides, the processor 330 may further include a data gathering unit (not shown), a ranking unit (not shown), and a deep link generating unit (not shown). To avoid a duplicate description, there may be omissions in the following description, but it would be apparent to a skilled artisan that all the functions of the above-described app list providing device 100 may also be included in the app list providing device 300 embodied in the user device.

The keyword determining unit 331 serves to determine one or more keywords from the message received and provided or entered and provided by the app list providing device 300.

The keyword determining unit 331 may include the functions of the data pre-treatment unit 120 of FIG. 2 to automatically determine the keywords from the received message. Hereinafter, for ease of description, the same parts as those of the data pre-treatment unit 120 are omitted from the description.

For example, the keyword determining unit 331 may determine keywords from the received message through named-entity recognition and tag and associate entities to the determined keywords. Accordingly, the keywords may be displayed on the display unit 340 to be differentiated according to their entities. As a more specific example, if a keyword corresponding to a location, a keyword corresponding to a person, and a keyword corresponding to a time are determined, then they may be displayed to be differentiated among the keywords by the user. Thus, the user may intuitively recognize what keywords have been recognized from the conversation message.

According to an embodiment, although an entity name is recognized as a keyword, no separate display may be made. For instance, unless there is an app that may be utilized albeit an entity name is recognized as a keyword, such entity name may be prevented from being displayed differentiated as a keyword.

According to an embodiment, when the user selects one or more keywords determined in the message, an app list related thereto may be shown, and the selected keywords may be displayed to be differentiated from each other. Selectable keywords included in the message may come with separate indications of being selectable, assisting in the user's selection.

By way of example, when the message has a single keyword, or the user selects one or more keywords from the message with a plurality of keywords, keywords selected and determined may be displayed to be differentiated from the rest of the message. As a specific example, a plurality of keywords in a message displayed in black may be displayed in blue, and among them, keywords selected by the user may be displayed in red or other color or in bold to be differentiated from the others. As such, one or more keywords determined by the user's input among a plurality of keyword candidates may be displayed to be differentiated from the other keyword candidates in various manners.

Meanwhile, when the message only contains a single keyword, no separate indication is needed, a plurality of keywords are connected complicatedly, other keywords are used other than the keywords given in the message, or when display of keywords is arbitrarily avoided, the keywords may be displayed without being differentiated.

The app list configuring unit 332 plays a role in configuring an app list displayed on the display unit 340 based on the keywords provided from the keyword determining unit 331.

When a single keyword provided from the keyword determining unit 331 or a single keyword present in the message meaningfully configures an app list, an app list may be configured focusing on the keyword. For example, in the case of the message "Let's meet at Starbucks," an app list may be configured which includes apps related to the particular location keyword "Starbucks."

According to an embodiment, if the message has a plurality of keywords, the apps in the app list may be displayed to be differentiated as to what keywords they are services for. For example, the app list configuring unit 332 may include, in the app list, app A related to a location-based service associated with the location keyword "Starbucks" in the message "Let's meet at Starbucks at 10 o'clock" and app B related to a scheduling service using both "Starbucks" and "10 o'clock." At this time, a first display corresponding to the location keyword may be applied to its related app A and app B, and a second display corresponding to the time keyword may be applied to app B alone. Accordingly, the user may easily identify what keyword each app is related to.

According to an embodiment, an app list including a plurality of keywords may be changed into an app list focusing on one keyword by the user's selection. For example, in a message including a location keyword and a time keyword, if the user selects the location keyword alone, a list of apps only related to the location may be configured and displayed. At this time, the updated app list may indicate that the app list displayed by continuously applying the display of the selected keyword is the app list related to the keyword selected by the user.

The app display controller 333 functions to determine how to display and control the app list provided by the app list configuring unit 332 on the display unit 340. For example, the app display controller 333 controls the user interface (UI) or user experience (UX) method for effectively displaying or arraying based on, e.g., the type, category, running method, or link information of apps, and the method for displaying the app list provided to the user through the display unit 340 is specifically described in connection with the following embodiments.

The app list customizing unit 334 may change the app list provided by the app list configuring unit 332 using the above-described personalized information. That is, the app list customizing unit 334 may provide the user with a customized app list based on the personalized information. What has been described above in connection with FIG. 2 applies here.

According to an embodiment, the app list customizing unit 334 may provide personalized information to the app list configuring unit 332, and the app list configuring unit 332 may determine apps to be included in the app list based on the personalized information. The app list customizing unit 334 may also determine the user's personal information based on, e.g., the user's sensing information or biometric information provided. For example, the app list customizing unit 334 may determine the user's emotional state based on biometric information previously stored or received through the input unit 310 or communication unit 320. To determine emotional state, at least one algorithm well known in the art may be used. Further, the app list configuring unit 334 may determine apps to be included in the app list based on at least one of the user's emotional state and the determined keyword. Further, the configuration of the app list currently displayed may be varied based on the user's emotion determined by the app list customizing unit 334.

Lastly, the display unit 340 plays a role in displaying, to the user, various data and/or information, such as messages or app lists, as described above. To that end, the display device 340 may include, but is not limited to, a liquid crystal display (LCD), a light emitting diode (LED) display, an organic light emitting diode (OLED) display, or a microelectromechanical systems (MEMS) display, or an electronic paper display. The display unit 340 may be combined with the input unit 310 into a touchscreen form.

Next, an app list providing method performed by the app list providing device 300 implemented in a user device is described with reference to FIG. 21. For ease of description, parts that overlap the app list providing method described above in connection with FIG. 11 are omitted from the description.

Figure 21:
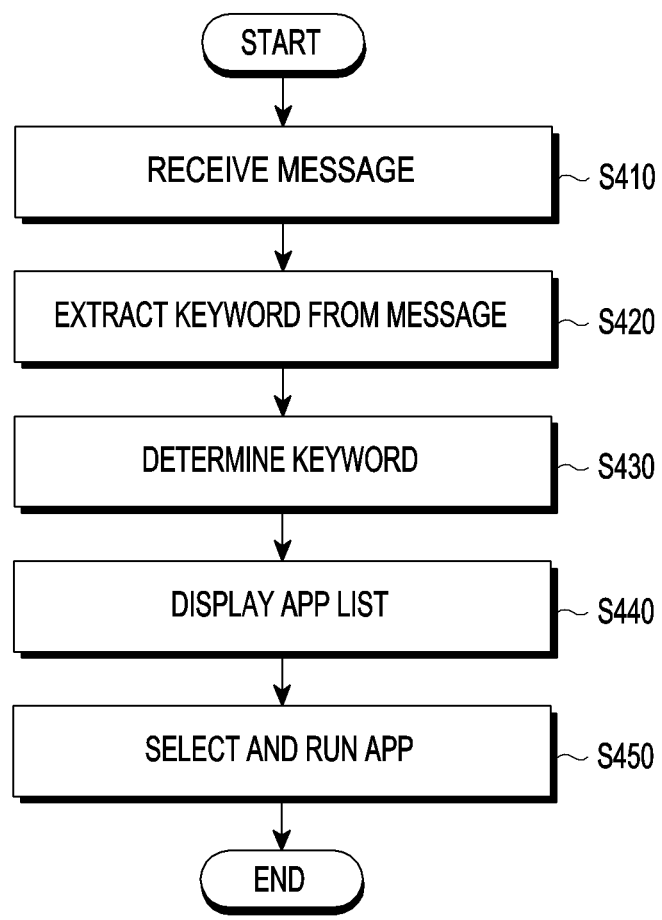
FIG. 21 is a flowchart illustrating a method for providing an app list according to an embodiment of the present invention.

Referring to FIG. 21, a message may be received from the other party of the conversation through, e.g., a message-related app or program installed on the app list providing device 300 (S410). Although typically receiving messages entered from the other party, receiving messages entered by the user may be included as well.

One or more keyword candidates may be extracted by, e.g., named-entity recognition (NER) processing on the message provided to the app list providing device 300 (S420). Specifically, whether a particular keyword or a particular entity is included according to a preset standard is grasped by analyzing the message text, and keyword candidates are extracted.

Final keywords may be determined from among the keyword candidates based on a preset standard or based on external information, e.g., the user's input (S430). For example, when the provided message has three or more keyword candidates, and the number of final keywords is two as per the preset standard, two keywords may be determined from the keyword candidates given, e.g., frequency or relevance to message conversation context. Optionally, the keyword candidates may be shown in the message, and one or more keywords may finally be determined based on the user's input. When there is only one keyword candidate, the single keyword candidate may be determined as the final keyword without any user input or other processing. Even when the message does not have any adequate keyword candidate, a keyword may be selected and determined based on the user's designation or input.

An app list including one or more apps may be determined and displayed based on one or more keywords determined (S440). For example, the app list may be positioned in a proper location, e.g., under, above, or on the side of the message, to be readily noticeable to the user while checking the message, but is not limited thereto. The app list may be formed to display the respective icons of the apps along with app names, and the apps may be displayed in the form of all links to execute the apps when clicked.

According to an embodiment, displaying the corresponding keyword on the top or side of the app list may indicate what keyword the app list displays the apps related to.

According to an embodiment, when a plurality of keywords are determined, the app lists related to the keywords may be displayed to be differentiated from each other. For example, each app list related to its corresponding keyword may be displayed to be differentiated from another based on at least one of the color, font, and location of the related keyword.

According to an embodiment, the app list may classify and display the plurality of apps depending on the type or category of the apps and may be displayed to include several apps in each folder per category. Further, apps with a particular entity of the app list may come with a separate identification. For example, the related app may be marked with an advertisement (AD) indication to be differentiated from the other apps.

According to an embodiment, at least one app of the app list may include a marker or indication to represent the entity of each app. For example, a marker to indicate, e.g., whether downloaded or not, whether deep link information is included or not, or whether hashtag (#) is searched or not, may be displayed on, e.g., the top right end of the app icon to allow the user to easily identify the entity of the app. For example, in the case of an app not stored or installed on the user device among the apps included in the app list, a marker may be displayed to indicate that it may be, or is required to be, installed, allowing the user to be directly taken to the path or page for installing the app via the deep link when the user chooses the app. That is, at least some apps of the app list may contain deep link information including a direct link related to, e.g., a particular page or content in the all.

Meanwhile, when the other party's conversation message is being entered while the app list is displayed in or near the message area, the other party's conversation message may be displayed not in the interface area but at the top end of the display unit or in another indicator area.

Next, the user may choose an app from the app list displayed and execute the chosen app (S450). The user may execute an app which he desires to run by an input action, e.g., touching. For example, unless the app selected by the user is stored or installed on the user device, the app may first be installed and then run.

According to an embodiment, when one app is selected by the user's touch input, an authentication operation related to the app may be executed along with the selection of the app. For example, when payment or authentication is required for a transaction on the Internet, the execution of the corresponding app and user authentication may simultaneously be carried out by a touch input, e.g., clicking on the app.

According to an embodiment, when the corresponding app contains deep link information, the deep link corresponding to the selected app may be executed, directly displaying a particular page or content in the app.

According to an embodiment, at least one of the apps not selected in the app list based on the user's app selection may be changed into another app, or the apps may be changed in order. For example, changing at least one of the not-selected apps in the app list into other app or the change in order of the apps may be performed based on at least one of the type of the selected app, the characteristic of the selected app, keyword, or context information related to the selected app.

Although not shown in FIG. 21, the app list providing method may further include the step of recommending conversation message to be sent to the other party of the conversation based on the user's selection and execution of a particular app. For example, in the circumstance in which a particular menu is selected through an app list configured by extracting meal-related keywords, and a restaurant for the particular menu is selected through the app list reconfigured later, conversation message recommendation list may be configured and displayed to inquire which restaurant he is to choose. Further, the future configuration of the app list may newly be determined depending on what is selected on the conversation recommendation list.

Some embodiments of the app list providing method are described below with reference to FIGS. 22 to 35.

Figure 22:
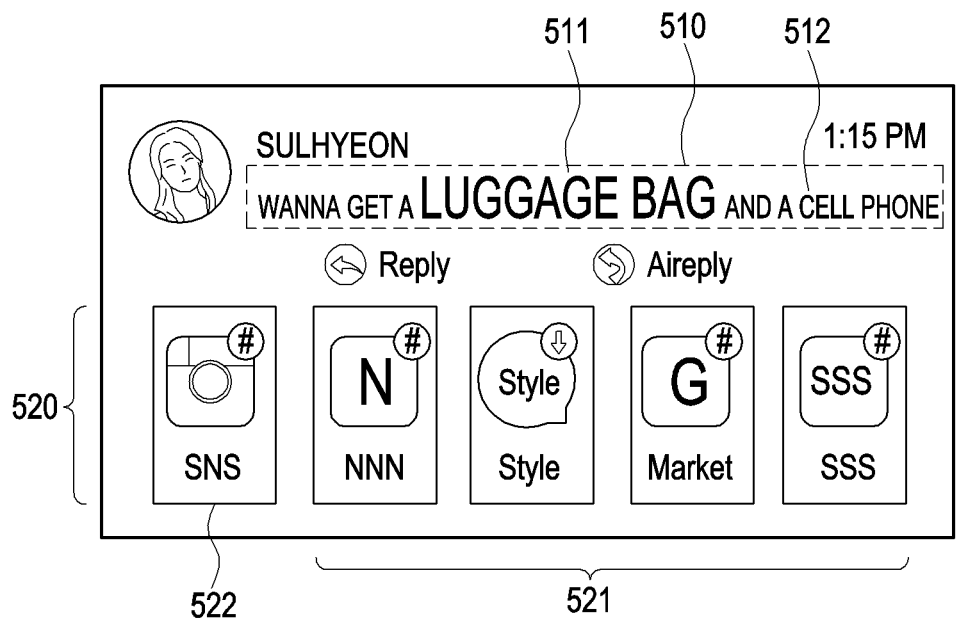
FIG. 22 is a view illustrating an example of a method for displaying an app list based on a plurality of keywords according to an embodiment of the present invention.

FIG. 22 is a view illustrating an example of a method for displaying an app list based on a plurality of keywords according to an embodiment of the present invention.

Referring to FIG. 22, in the sentence "wanna to get a luggage bag and a cell phone" displayed on the message window 510, "luggage bag" 511 and "cell phone" 512 each of which has an entity of product may be determined as keywords, and the first keyword "luggage bag" 511 and the second keyword "cell phone" 512 may be displayed differently, e.g., in different colors, different thicknesses, different fonts, or in other various manners.

According to an embodiment of the present invention, when a plurality of keywords are determined, the app lists related to the keywords may be displayed to be differentiated from each other. For example, each app list related to its corresponding keyword may be displayed to be differentiated from another based on at least one of the color, font, and location of the related keyword.

Referring to FIG. 22, an app list 520 with five apps is shown. The number of apps included in the app list 520 may be varied depending on, e.g., the size of the display, user settings, and convenience. Here, the app list 521 related to the first keyword "luggage bag" 511 may include, e.g., a Naver, Mango style, Gmarket, and SSG app, and the app list 522 related to the second keyword, "cell phone" 512, may include, e.g., an Instagram app. At this time, for easier identification as to what keyword each app in the app list 520 is related to, the rectangular edge enclosing each app may be displayed to match in color the related keyword. For example, the first keyword "luggage bag" 511 may be displayed in blue, the edge of each app in the app list 521 related to "luggage bag" 511 in blue, the second keyword "cell phone" 512 in red, and the edge of the app in the app list 522 related to "cell phone" 512 in red. This allows the user to easily notice what keyword each app in the app list 520 is related to.

According to an embodiment, the app name displayed under the app included in the app list 520 may be displayed in the same font as the related keyword, thereby allowing apps related to different keywords to be displayed, differentiated from each other. Further, apps related to the first keyword "luggage bag" 511 positioned to the left in the message window 510 are arranged to the left in the app list 520, apps related to the second keyword "cell phone" 512 positioned to the right in the message window 510 are arranged to the right in the app list 520, and the apps related to each keyword may be bordered to indicate what keyword each app in the app list 520 relates to.

Meanwhile, although FIG. 22 illustrates that the apps in the app list 520 have the same size, the apps may be flexibly resized depending on the number of apps related to each keyword. For example, when the apps related to the first keyword are more than the apps related to the second keyword, the apps related to the first keyword may be displayed in a smaller size than the apps related to the second keyword.

Figure 23:
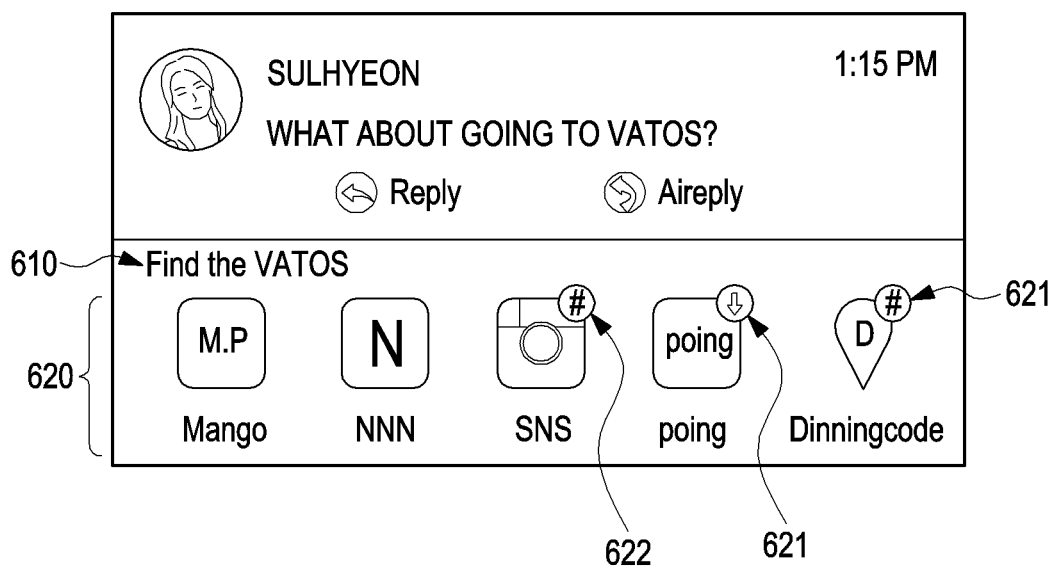
FIG. 23 is a view illustrating an example of a method for displaying an app list based on a marker indicating the entity of an app according to an embodiment of the present invention.

FIG. 23 is a view illustrating an example of a method for displaying an app list based on a marker indicating the entity of an app according to an embodiment of the present invention.

As shown in FIG. 23, a marker to indicate the entity of each app may be displayed at the top right end of the app icon for at least one of the apps included in the app list. Although FIG. 23 illustrates that the marker to indicate the entity of app is displayed at the top right end of the app icon, it may be displayed in other various locations, e.g., at the bottom right end, top center, bottom center inside, or near the app icon.

Here, the entity of app may include, e.g., whether downloaded or not, whether a deep link is included or not, or whether hashtag (#) is searched or not. Referring to FIG. 23, the related app list 620 may be provided under the keyword display part 610 that displays "Vatos" determined as a keyword in the message provided. For apps downloaded or installed on the user device yet, such as Poing and Diningcode, among the apps included in the app list 620, download-or-no markers 621 which indicates that the apps are not installed yet but downloadable may be displayed at the top right ends of the apps.

For Instagram supporting hashtag (#) searches, a hashtag search-or-no marker 622 may be displayed at the top right end of the app.

According to the instant embodiment, an entity-related marker may be displayed to allow the user to easily, and at a glance, notice the entity of each app in the app list 620.

Figure 24:
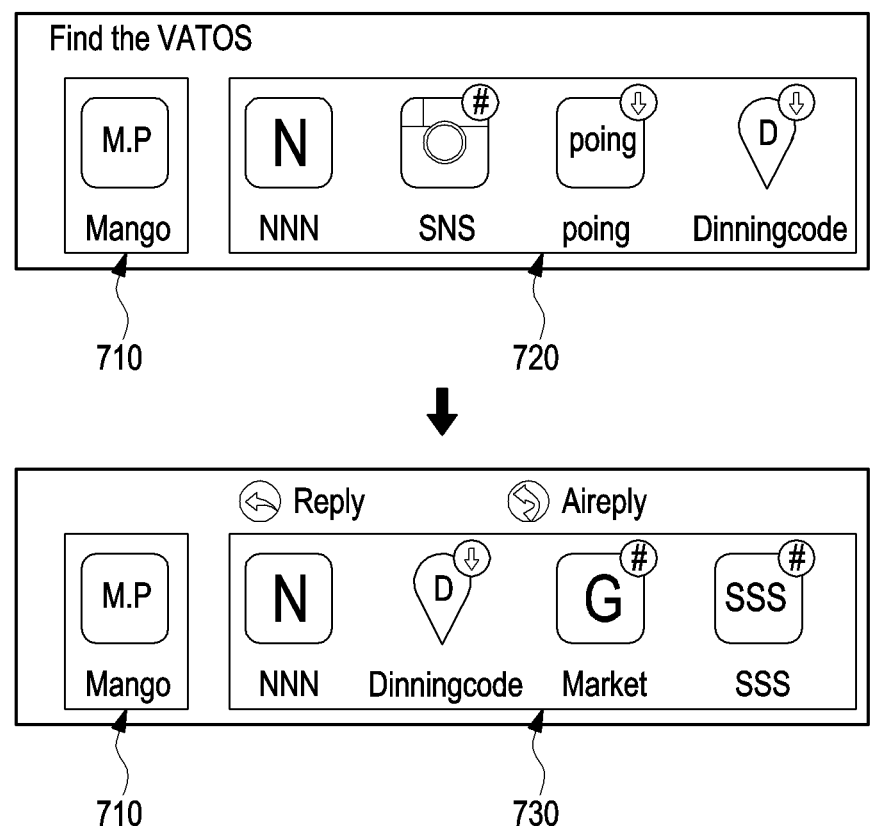
FIG. 24 is a view illustrating an example of a method for displaying an app list in which the array of apps is varied based on an app choice according to an embodiment of the present invention.

FIG. 24 is a view illustrating an example of a method for displaying an app list in which the array of apps is varied based on an app choice according to an embodiment of the present invention.

Referring to FIG. 24, when the user selects the Mango plate app 710 by the user's input in the app list related to the keyword "Vatos," at least one of the non-selected apps included in the app list may be changed into another app or the apps may be changed in order based on the user's app selection. That is, as shown in FIG. 7, the app list 710 may be changed into the app list 730 in which the other apps, other than the Mango plate app 710, selected by the user on the app list first displayed have been changed in type and array to have a higher relevance to the selected app by the user's app selection.

According to an embodiment of the present invention, at least one of non-selected apps may be switched into other app, or the apps in the app list may be re-arrayed based on at least one of the type, characteristic of the selected app, context information related to the selected app, or keyword. For example, the user's context information may be re-grasped at the time of entry of the user's selection based on the type and characteristic of the app first selected by the user, and the array of the app links may be adjusted based on the grasped context information.

Further, the app list first displayed may display app lists belonging to at least two or more categories to permit more choices, and if the user context is later grasped more precisely according to the type and characteristic of the app selected by the user, then the same or similar apps to the selected app may be expanded and arrayed. Whether there is a sequence of execution based on the type and characteristic of the selected app, the next-executed app may be displayed in the app list. For example, what to eat is first determined, and if the type of food is determined, the restaurant app related to the determined food is displayed to determine which restaurant to go to, and then, if the particular restaurant app is selected, the app related to the schedule after meal at the particular restaurant may be displayed, and as such, the apps may be sequentially displayed as recommended apps.

Figure 25:
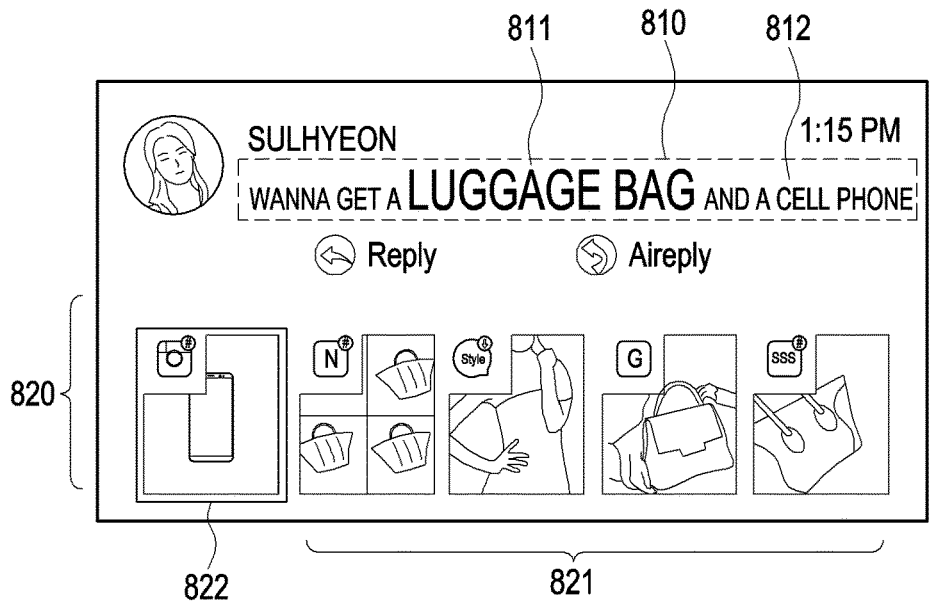
FIG. 25 is a view illustrating an example of a method for displaying an app list having preview information according to an embodiment of the present invention.

FIG. 25 is a view illustrating an example of a method for displaying an app list having preview information according to an embodiment of the present invention.

Referring to FIG. 25, the apps, along with preview information related to the keyword, may be displayed in the app list 820. For example, for the apps 821 related to the first keyword "luggage bag" 811, luggage bag-related images are shown as preview information, and for the app 822 related to the second keyword "cell phone" 812, a cell phone-related image is shown as preview image information in FIG. 25. According to an embodiment, the user may previously notice the information that the corresponding app provides and may thus determine his desired app in a quick and precise manner.

For reference, although FIG. 25 illustrates an example in which images related to the corresponding keyword are provided as preview information, other types of information, such as video, music, or text, may be provided as preview information.

Figure 26:
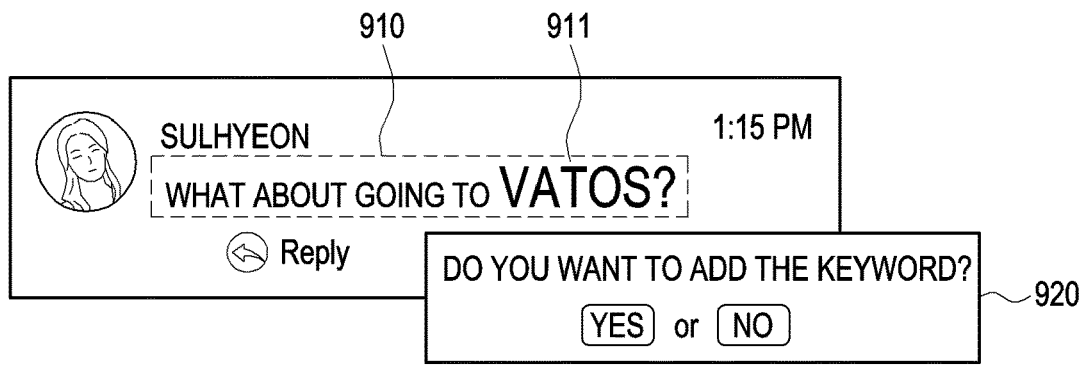
FIG. 26 is a view illustrating an example of additionally registering a keyword according to an embodiment of the present invention.

FIG. 26 is a view illustrating an example of additionally registering a keyword according to an embodiment of the present invention.

Whether no keyword is extracted from the message by the named-entity recognition algorithm, such a function may be provided as to allow the user to select and register keywords on their own. However, the instant embodiment is not limited thereto. According to an embodiment, even when a keyword is extracted, the user may select and register keywords.

Referring to FIG. 26, whether no keyword is extracted from the displayed message "what about going to Vatos" 910 and the user selects "Vatos" 911 to additionally register the keyword "Vatos" 911, a keyword add-or-no message 920 may be displayed, and an additional registering of a keyword may be performed according to the user's selection input.

Conversely, the function of excluding a keyword may be provided. That is, when a plurality of keywords are provided from the message, the user may exclude some keywords which they are not interested in, allowing an app list fitting the user's interest to be recommended. Specifically, if all of the keywords extracted from the message are displayed, the user may select and delete out keywords of no interest to the user. An example related thereto is shown in FIG. 27.

Figure 27:
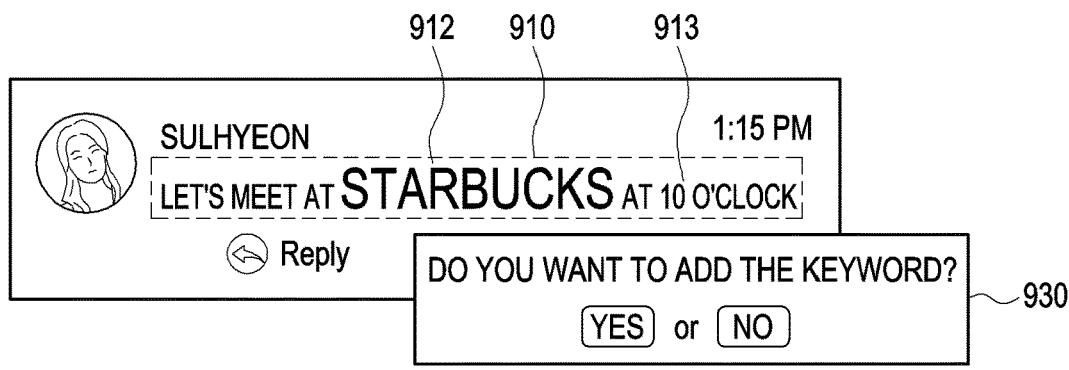

Referring to FIG. 27, if two keywords "Starbucks" 912 and "10 o'clock" 913 are extracted from the displayed message "Let's meet at Starbucks at 10 o'clock" 910, the user may select, e.g., "10 o'clock" 913 to exclude the keyword of no interest. Then, a keyword exclude-or-no message 930 may be provided, and the keyword excluding function may be performed by the user's selection input.

For reference, it is also possible to select all of the keywords of interest from among a plurality of keywords to configure various app lists. It may also be possible to select two or more keywords of interest from among the keywords extracted from the displayed message to update the app list.

Figure 28:
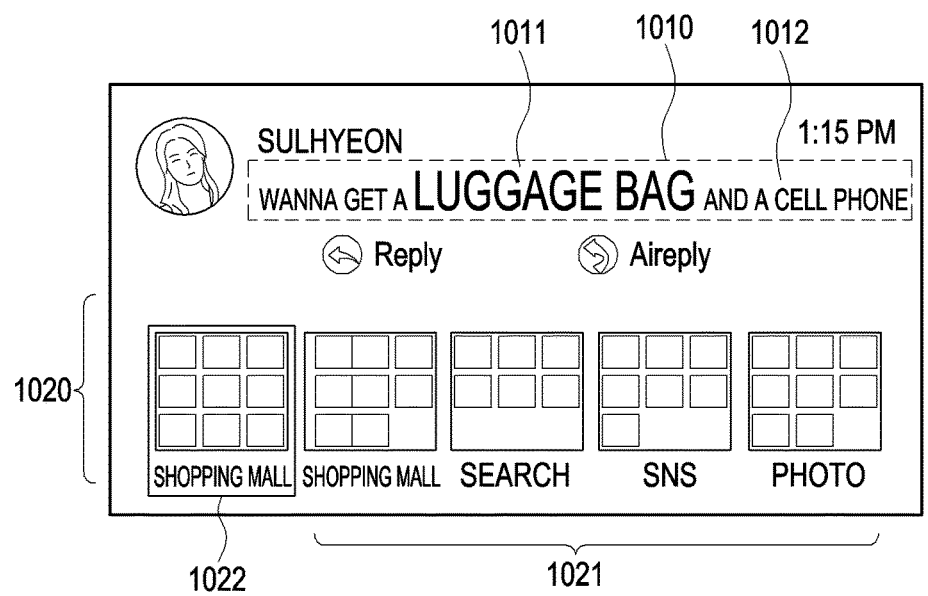
FIG. 28 is a view illustrating an example of a method for displaying an app list classified per category according to an embodiment of the present invention.

FIG. 28 is a view illustrating an example of a method for displaying an app list classified per category according to an embodiment of the present invention.

According to the instant embodiment, when various types of or multiple apps may be recommended from a keyword in the message, apps of the same or similar category may be grouped and displayed.

Referring to FIG. 28, it is assumed that "luggage bag" 1011 and "cell phone" 1012 are determined as keywords from the sentence "wanna to get a luggage bag and a cell phone" displayed on the message window 1010. Then, an app list 1021 related to "luggage bag" 1011 and an app list 1022 related to "cell phone" 1012 may be displayed, differentiated from each other. Here, the app lists 1021 and 1022 may be provided in the form of an app folder enclosing apps of the same subject or category, rather than a single app.

For example, the app list 1021 may put the apps whose categories are shopping mall, search, SNS, and photo in their respective folders and display them per category, and the app list 1022 related to "cell phone" 1012 may put together, and display, the apps of shopping mall category. According to an embodiment, the respective representative category names of the categories may be displayed together.

Figure 29:
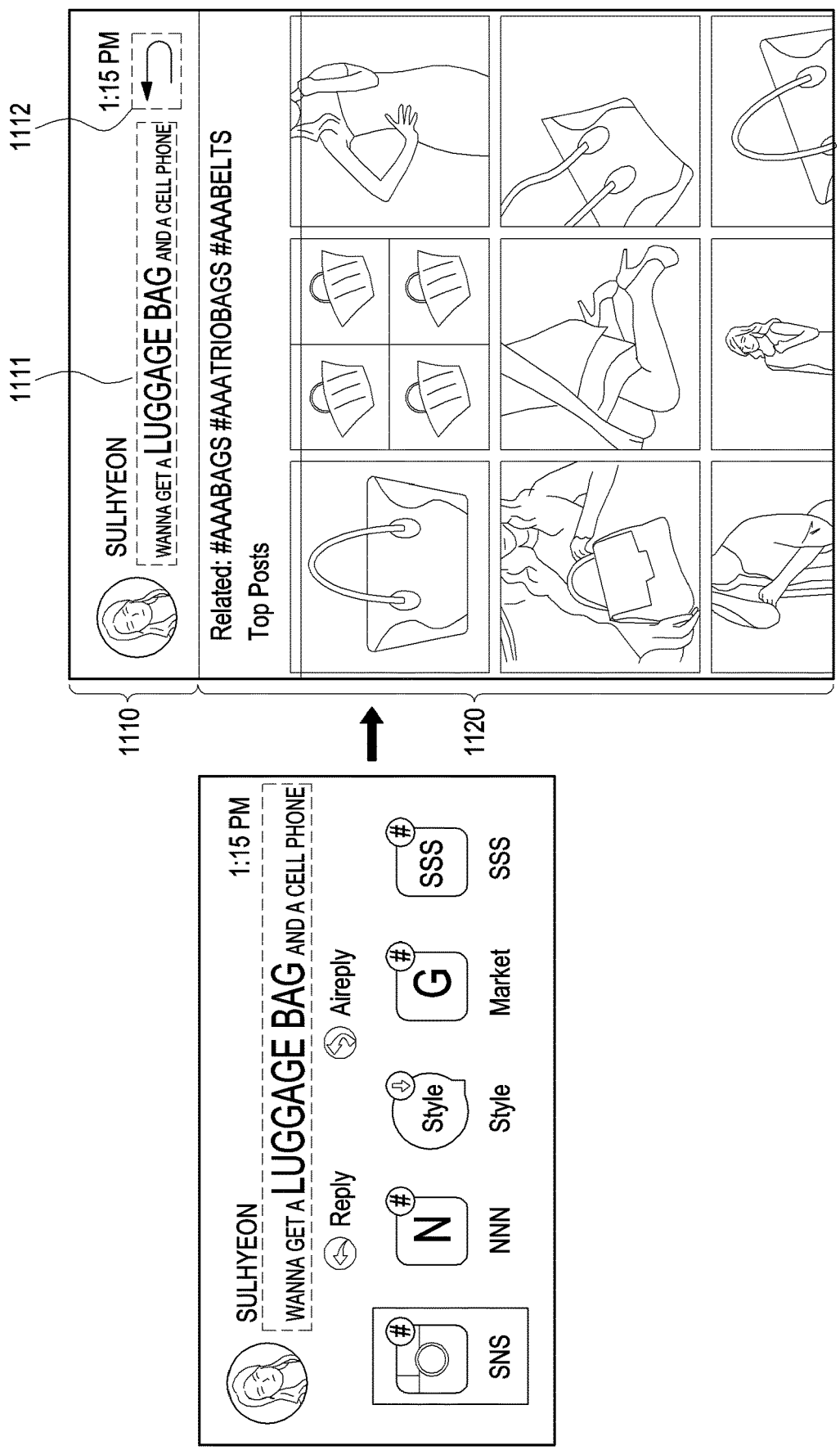
FIG. 29 is a view illustrating an example of a method for displaying relevant information while switching app screens according to an embodiment of the present invention.

FIG. 29 is a view illustrating an example of a method for displaying relevant information while switching app screens according to an embodiment of the present invention.

Referring to FIG. 29, when the Instagram app is selected from the app list related to the keyword "luggage bag" determined on the message window, related images or contents may be provided through, e.g., hashtag search that the Instagram app supports.

According to this embodiment, even after switching into the app screen by the user's app selection, the message window 1110 may be displayed at the top of the screen for a preset time, and the keyword 1111 selected or determined from the message in the message window 1110 may be distinctively displayed in bold or in a different color. According to the present embodiment, even after app selection, the message window 1110 may be displayed at the top of the screen for a predetermined time. Thus, upon switching screens, information about selection may be checked again. Further, when the user has selected a wrong app or desires to change, a menu 1112 for going back to the previous step may be provided. This way enhances user convenience.

Figure 30:
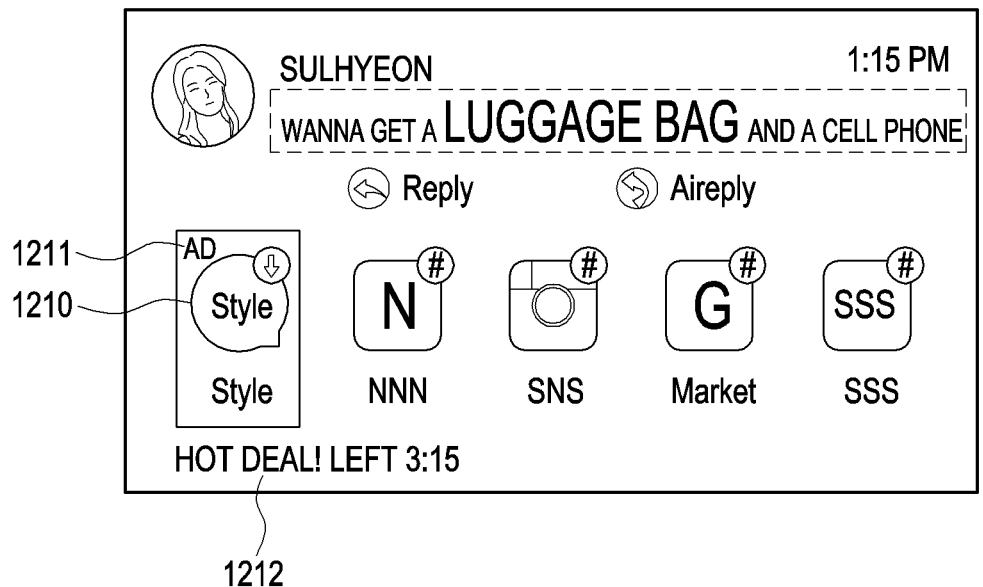
FIG. 30 is a view illustrating an example of a method for displaying an app list including an advertisement-related app according to an embodiment of the present invention.

FIG. 30 is a view illustrating an example of a method for displaying an app list including an advertisement-related app according to an embodiment of the present invention.

Referring to FIG. 30, in the case of, among apps, the Mango style app 1210 having an entity of advertisement, such as time limit, hot deal, or product recommendation, a marker 1211 having an entity of advertisement may be displayed, and time limit or hot deal information 1212 may be separately displayed adjacent to the app list. A visual effect may apply to the hot deal information 1212.

It may also be possible to provide varying visual effects depending on the context information about the user receiving the app list, e.g., recognition of a particular app, use history, or preference.

Figure 31:
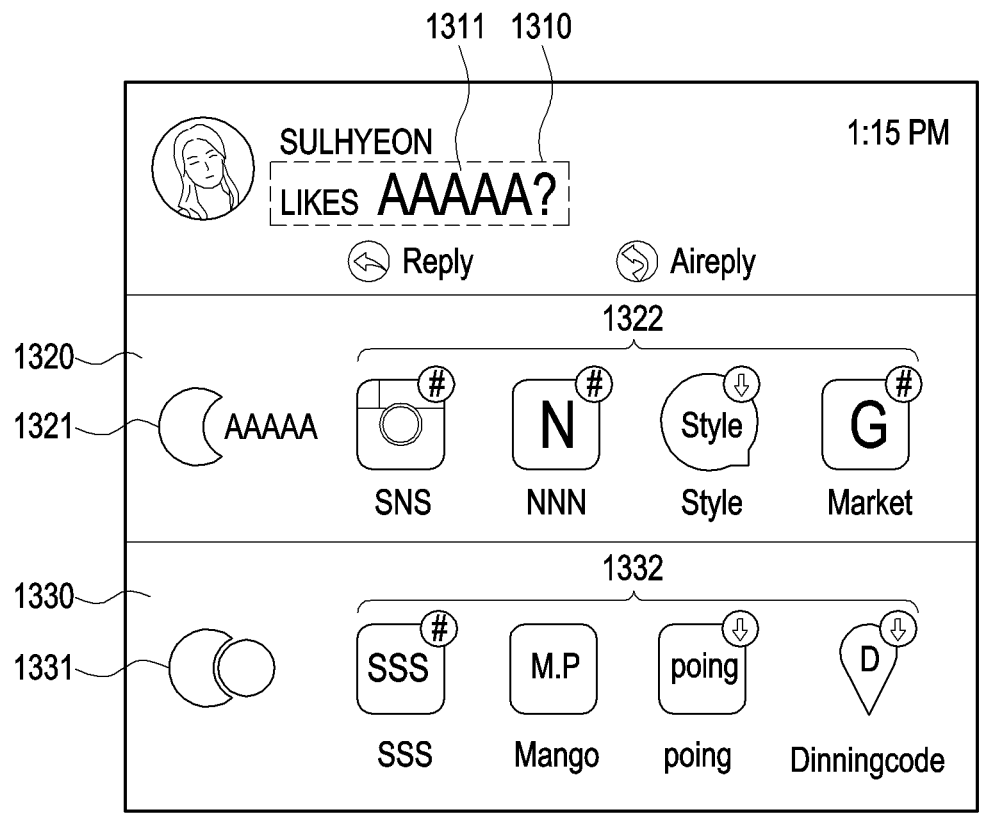
FIG. 31 is a view illustrating an example of a method for displaying an app list for a homonym keyword according to an embodiment of the present invention.

FIG. 31 is a view illustrating an example of a method for displaying an app list for a homonym keyword according to an embodiment of the present invention.

Whether any one of the keywords extracted has multiple meanings or indicate multiple things, a representative image for each meaning may be displayed on the app list, increasing the accuracy and convenience in the user's app selection.

Referring to FIG. 31, it is assumed that the keyword "apple" 1311 is determined from the message "like apple" 1310 on the message window. Here, the keyword may have a first meaning, as the name of the electronics company, Apple, and a second meaning, as a kind of fruit. In such a case, the app list display area may be divided into an app list area 1320 related to the first meaning and an app list area 1330 related to the second meaning, which may display their related app lists 1322 and 1332, respectively.

Further, the company logo 1321 to the left and the related app list 1322 to the right may be displayed together in the app list area 1320 related to the first meaning. Likewise, an image 1331 of the fruit apple to the left and the related app list 1332 to the right may be displayed together in the app list area 1330 related to the second meaning. At this time, the logo or image to represent the semantics of the keyword may lessen the area where the apps are arranged. Thus, the icon of each app may be flexibly resized.

Figure 32:
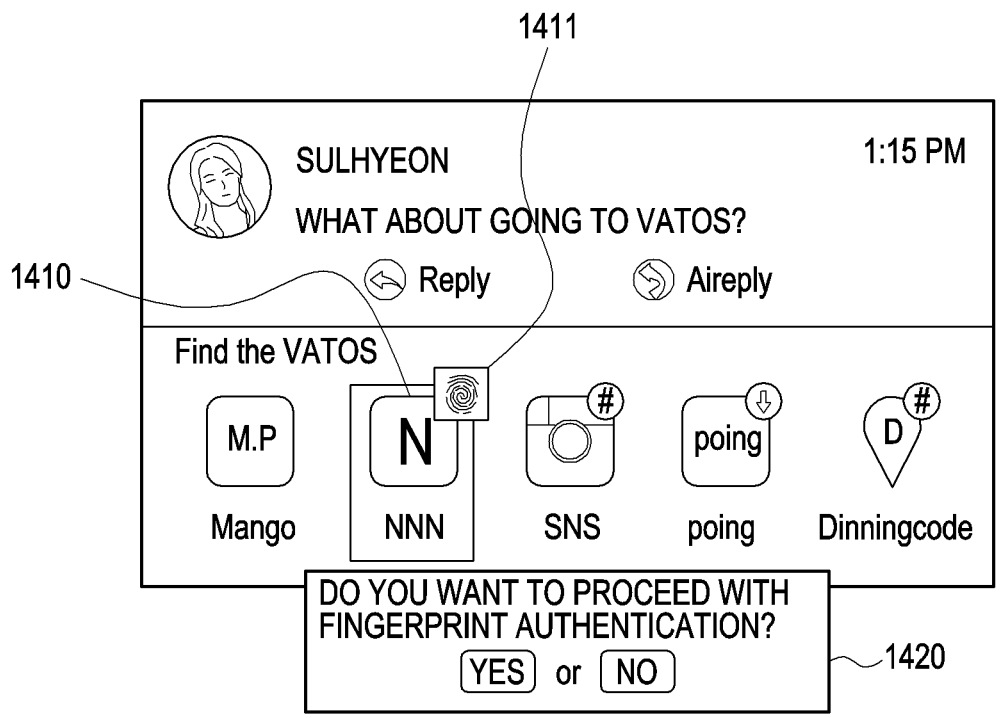
FIG. 32 is a view illustrating an example of a method for displaying an app list including the function of scanning the user's fingerprint according to an embodiment of the present invention.

FIG. 32 is a view illustrating an example of a method for displaying an app list including the function of scanning the user's fingerprint according to an embodiment of the present invention.

It is assumed that the app list providing device 300, e.g., a smartphone, tablet, or laptop computer, comes with a fingerprint scannable touchscreen, and an app requiring user authentication information is among the apps in the app list. Then, an app list may be provided so that fingerprint scanning may be performed simultaneously with touching on the app icon area. In such a case, the user may run user authentication or be led to a particular page as required, by simply selecting the app without taking a separate login step. For a better understanding, the example shown in FIG. 32 may be described.

Referring to FIG. 32, in the case of, e.g., the Naver app 1410 requiring user authentication, a marker 1411 indicating that fingerprint authentication is required may be displayed together. Here, the display of the marker may be varied depending on the type of authentication. The user may select whether to do fingerprint authentication on the message window 1420 asking whether to proceed with fingerprint authentication provided according to the selection of the Naver app 1410 and may conveniently proceed with authentication on the app.

Figure 33:
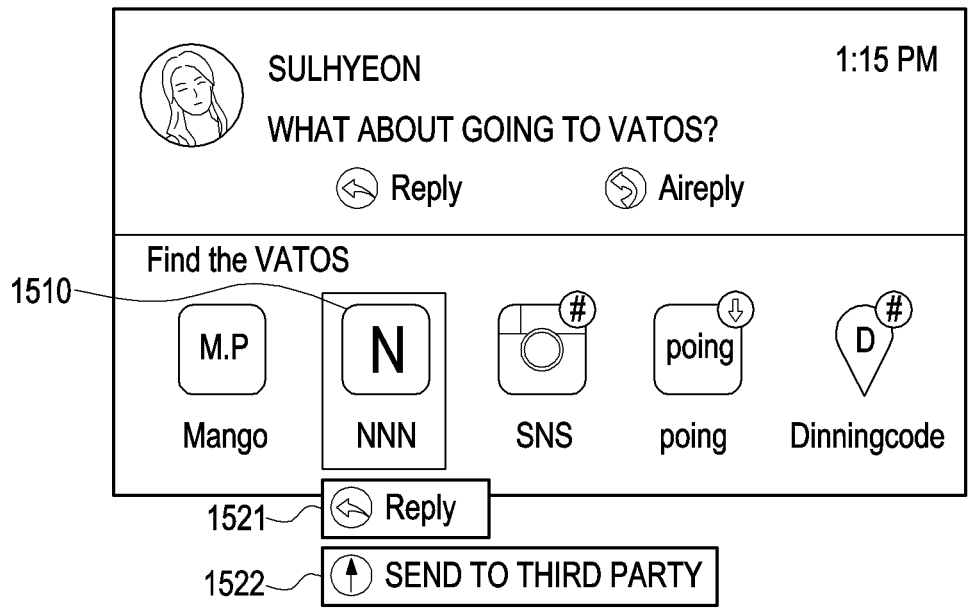
FIG. 33 is a view illustrating an example of a method for displaying an app list including the function of transferring a deep link to the other party to the conversation or a third party according to an embodiment of the present invention.

FIG. 33 is a view illustrating an example of a method for displaying an app list including the function of transferring a deep link of a particular app to the other party of the conversation or a third party according to an embodiment of the present invention. In this embodiment, there may be provided a selection menu to transmit the deep link of the app selected from the app list to the other party of the conversation or a third party.

Referring to FIG. 33, as apps related to the keyword "Vatos" are included in the app list, and the Naver app 1510 contains a deep link regarding the page related to "Vatos," a particular page or particular content related to "Vatos" may immediately be displayed upon executing the Naver app 1510. At this time, the app list, along with a Reply menu 1521 for transferring the deep link of the selected Naver app 1510 to the other party to the conversation, may be displayed. Further, a third party transmission menu 1522 for transferring the deep link of the Naver app 1510 to a third party, not the other party to the conversation, may be displayed together with the app list.

For reference, the deep link of app received by the other party of the conversation or third party may be determined variable for the connected target page depending on, e.g., whether the receiving device has the app installed or whether there is an authority to access the app.

According to an embodiment, it is also possible to generate the text of the conversation between the user and the other party as the deep link of the app and to transmit it to the third party. It is also possible to configure the app list based on the common context information between the user and the other party and to transmit the same to the third party in the form of a deep link. At this time, the third party, upon running the generated deep link, may check the past and current conversations that proceed between the user and the other party.

Figure 34:
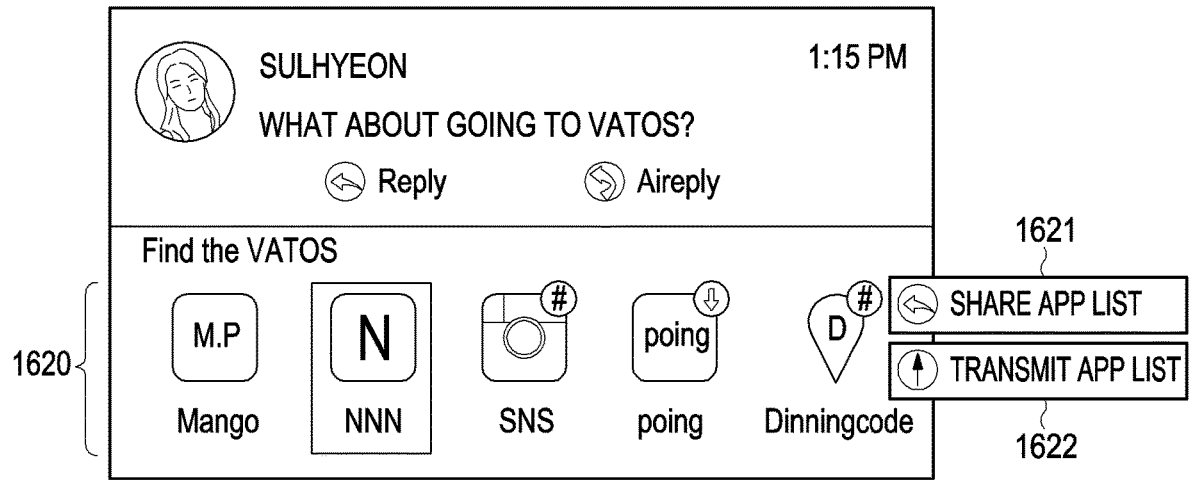
FIG. 34 is a view illustrating an example of a method for displaying an app list including the function of sharing the app list with the other party to the conversation or a third party according to an embodiment of the present invention.

FIG. 34 is a view illustrating an example of a method for displaying an app list including the function of sharing the app list with the other party of the conversation or a third party according to an embodiment of the present invention.

In this embodiment, the app list may simultaneously be shared with the device of the other party to the conversation, and information about the selection of app list of at least one of the user device (e.g., the app list providing device 300) and the other party's device may also be shared.

Referring to FIG. 34, an app list share menu 1621 for sharing the provided app list 1620 with the other party's device may be displayed along with the app list. Further, an app list transmission menu 1622 for transmitting the app list 1620 to the third party may be displayed together with the app list. At this time, upon the user's entry of selection to share the app list with the other party or third party, the app list 1620 may simultaneously be displayed on the screen of the other party's device or the third party's device. Further, the execution state of the app, as an example, may be displayed to be shared on their screens, corresponding to their input information on the particular app.

Further, if an additional message of the conversation with the other party is entered after the app list is shared, the app list may be reconfigured based thereupon, and the reconfigured app list may be shared between the devices of the user and the other party. According to an embodiment, in the case of an app containing sensitive information, e.g., personal information or security information, in the app list, such information may be prevented from being shared with the other party to the conversation.

Figure 35:
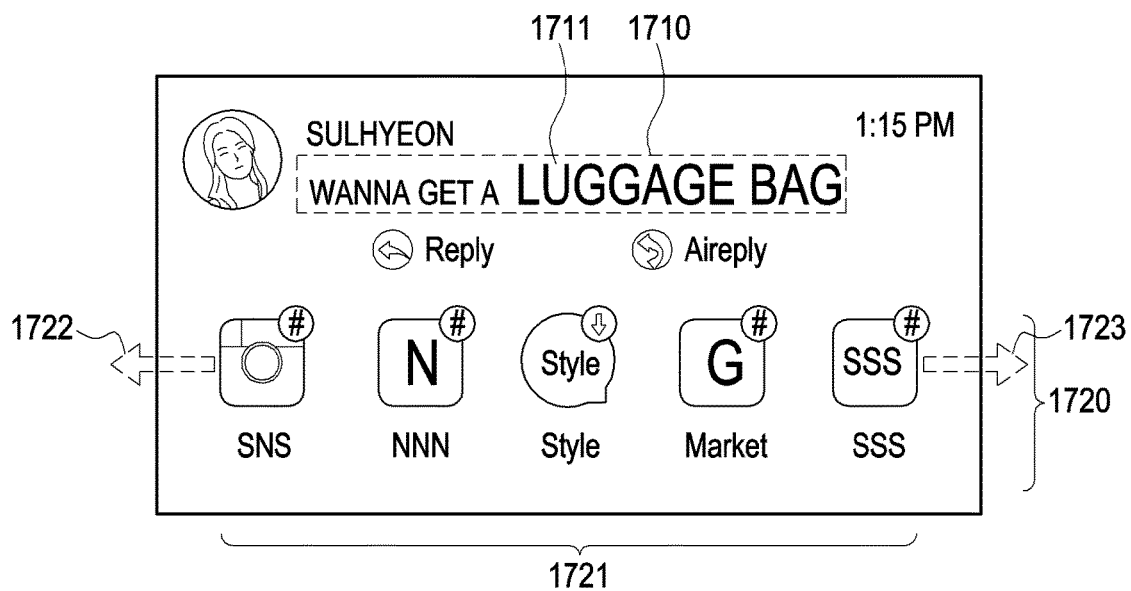
FIG. 35 is a view illustrating an example of a method for displaying an app list in which the array of apps is variable according to an embodiment of the present invention.

FIG. 35 is a view illustrating an example of a method for displaying an app list in which the array of apps is varied according to an embodiment of the present invention.

According to the instant embodiment, the arrangement of one or more apps included in the app list may be reconfigured by the user's input to allow the user to effectively provide the app list and select an app in the limited display space of the user device.

Referring to FIG. 35, it is assumed that the app list 1720 related to the keyword "luggage bag" 1711 in the message window 1710 includes a plurality of apps, and the app list 1721 currently displayed displays only five apps due to, e.g., screen limit. When the app list 1721 currently displayed does not include an app which the user desires to select or the user desires to search for an additional associated app list, the user may vary the displayed app list 1721 using a go left button 1722 or a go right button 1723.

According to an embodiment, the apps may be moved up and down, as well as left and right, in the app list display area, and the app list may be reconfigured by a touch input, e.g., scroll or drag. Further, an app subsequent in order to the apps displayed on the app list may be displayed by moving in the app list display area.

According to an embodiment, changing the display of the app list may be carried out by the user's gesture recognized through, e.g., the user device (e.g., the app list providing device 300) or a sensor wiredly or wirelessly connected with the user device, rather than the user's direct input. In such a case, the user, even without taking such an action as a direct touch, may fulfill the corresponding function by a gesture action.

Some embodiments of the app list providing method have been described above with reference to FIGS. 22 to 35. Now described are embodiments for providing a customized app list using the user's personalized information, with reference to FIGS. 36 and 37.

Figure 36:
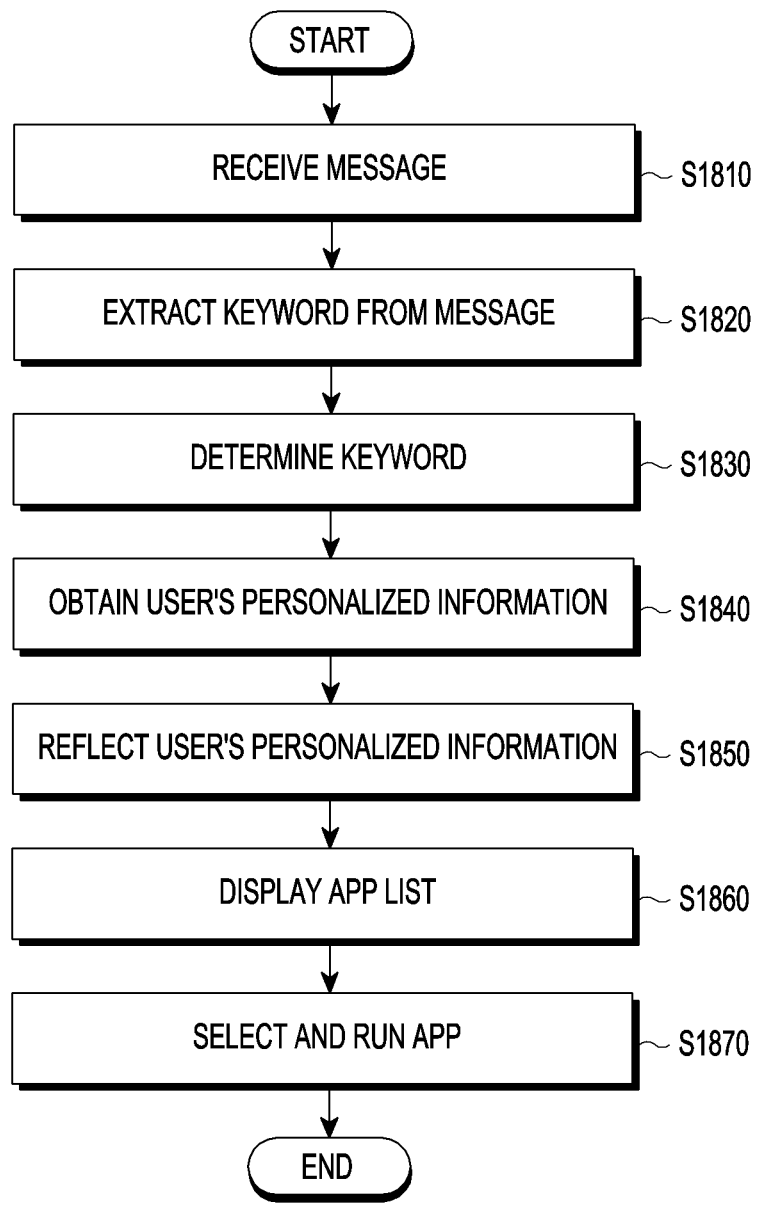
FIG. 36 is a flowchart illustrating a method for providing an app list based on a user's personalized information according to an embodiment of the present invention.

FIG. 36 is a flowchart illustrating a method for providing an app list based on a user's personalized information according to an embodiment of the present invention.

Referring to FIG. 36, the app list providing device 300 may receive a message from the other party of the conversation (S1810) and extract at least one keyword candidate through processing, e.g., named-entity recognition (NER) (S1820). Final keywords may be determined from among the keyword candidates based on a preset standard or based on external information, e.g., the user's input (S1830).

At this time, the user's personalized information including the user's personal information and the user's context information may be obtained (S1840). The personalized information has been described above, thus no description thereof is given below.

The app list may be varied based on the user's personalized information. Or, the customized app list may be determined comprehensively considering the keyword and the user's personalized information (S1850). The customized app list as per the personalized information may be displayed on the user screen (S1860), and as the user selects an app, the app may be executed (S1870).

Figure 37:
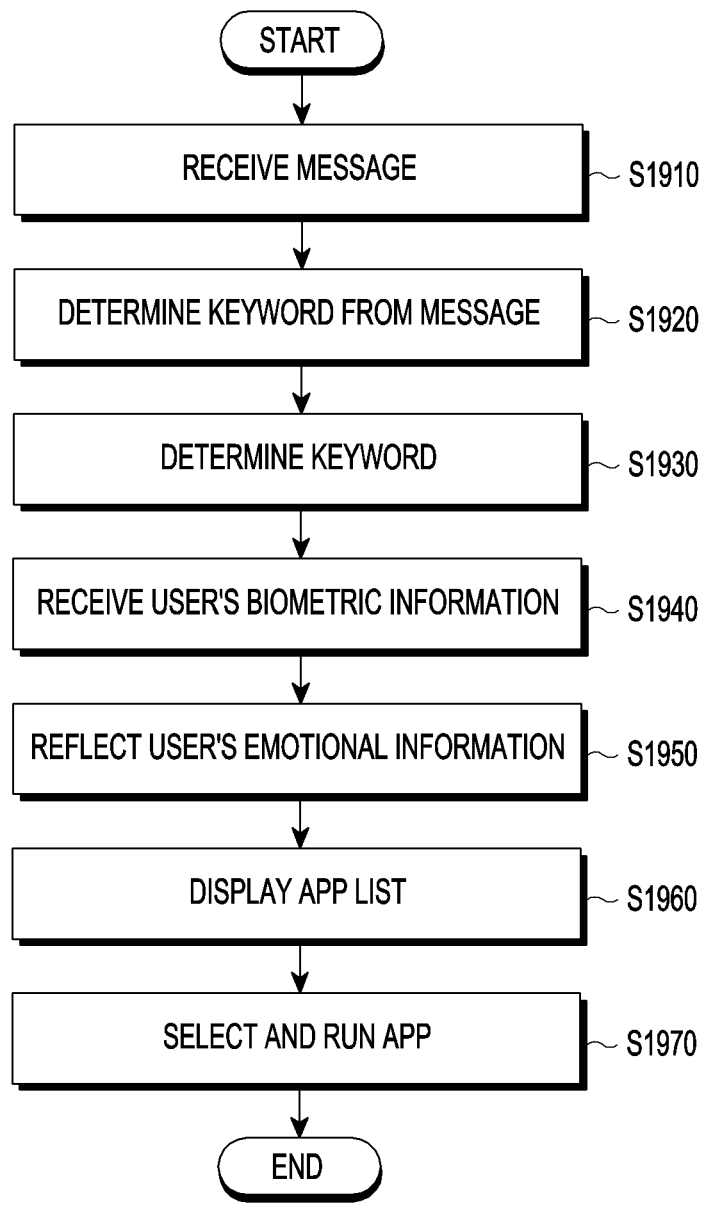
FIG. 37 is a flowchart illustrating a method for providing an app list based on a user's biometric information of the user's personalized information according to an embodiment of the present invention.

FIG. 37 is a flowchart illustrating a method for providing an app list based on a user's biometric information of the personalized information according to an embodiment of the present invention.

According to this embodiment, as the app list providing device 300 receives the user's biometric information and determines the user's emotion based on the biometric information, the configuration of the app list may be varied or a new app list may be provided based on the user's emotion.

Referring to FIG. 37, the app list providing device 300 may receive a message from the other party of the conversation (S1910) and extract one or more keyword candidates through processing, e.g., named-entity recognition (NER) (S1920). Final keywords may be determined from among the keyword candidates based on a preset standard or based on external information, e.g., the user's input (S1930).

At this time, the app list providing device 300 may obtain the user's biometric information using a sensor installed inside or out or by analyzing the text of the message provided to the user device (S1940). Here, the user biometric information may include, e.g., pulse, blood pressure, respiratory pattern, fingerprint, voice, brain wave, stress index, and excitement degree, and may further include other various body information and sentimental information.

In the case of analysis of message text, it may be possible to estimate the mental state or emotional state at the time of the conversation by sensing the pulse, degree of excitement, or other biometric information within the period of entry of the message, as well as the user context information and to determine an app list more appropriate for the user's current mental state by reflecting variations in the emotional state during the conversation.

As such, it is possible to derive the user's emotional information based on the user biometric information and vary the app list based on the derived user emotional information or determine the app list comprehensively considering the keyword and the user emotional information (S1950). The determined app list may be displayed on the user screen (S1960), and as the user selects an app, the app may be executed (S1970).

Embodiments for providing a customized app list using the user's personalized information have been described above with reference to FIGS. 36 and 37. Now described with reference to FIG. 38 is an embodiment of the present invention regarding a method for providing an app list through a virtual reality interface.

Figure 38:
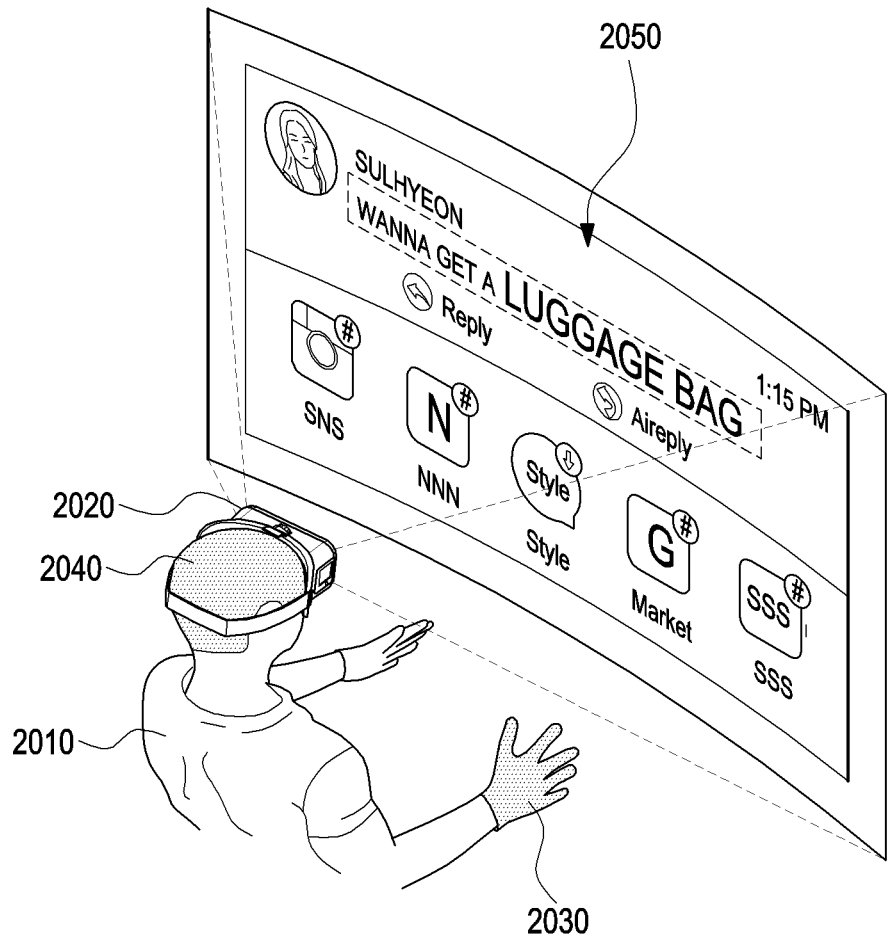
FIG. 38 is a flowchart illustrating a method for providing an app list through a virtual reality interface according to an embodiment of the present invention.

Referring to FIG. 38, it is assumed that the user 2010 wears a head-mounted display (HMD) 2020, and as the user 2010 turns their head 2040 while wearing the HMD 2020, the app list display area may be adjusted within the user's field of view through the virtual reality interface.

In this case, a method for configuring an app list to be displayed on the virtual space may be determined given conversation information in the virtual environment, and the app list display area may be divided into controllable areas, such as move, select, or run, by spatial gesture commands.

Further, the user's context information may be grasped using a sensor mounted in the wearable device, such as the HMD 2020. For example, the user's context information may be grasped by, e.g., gaze tracking, brain wave scanning, or facial expression scanning, and the app list may be reconfigured or a target page to be linked through an app deep link may be determined based on the context information.

Referring to FIG. 38, the user 2010 additionally puts a wearable globe 2030 on their hand. The user 2010 may accurately perform gesture recognition and operation control using the wearable globe 2030 put on their hand. As the wearable globe 2030 may interact with the HMD 2020 worn on the user's head, the user may more intuitively perform various functions, e.g., selecting or varying the app list.

According to an embodiment of the present invention, it is possible to provide the app list based on the user information and context information determined based on information about the voice conversation (routine conversation, voice/video call, etc.) with the other party. The voice conversation information may be displayed on the screen of the app list providing device 300 by speech-to-text (STT) technology, a keyword may be extracted and determined based on the so-converted text, and the app list may be provided based on the determined keyword.

According to an embodiment of the present invention, it is possible to apply, e.g., information about a conversation with an artificial intelligence (AI) computer or robot, search input information, social media information, or social network service (SNS) information, as well as message text, to the app list configuring method on the message interface. For example, the more conversation is made with the artificial intelligence computer, the more various pieces of search information are entered through the search window, or the more diversified postings are up on the user's SNS, the further personalized app list may be built up. It may also be possible to extract a keyword of interest from among several keyword candidates based on text or voice information entered to various interfaces, e.g., search, email, SNS, schedule, or to-do-list (notepad), as well as the conversation message.

According to an embodiment of the present invention, it is possible to transmit a deep link alongside multimedia content. For example, upon transmission of multimedia data (e.g., an image, file, or video) to the other party of the conversation on the chatting window, the deep link generated in relation may also be transmitted. Upon viewing the multimedia content received by the other party's device, this may function as a triggering command to display the relevant deep link app list on the screen.

For example, if a food-related image file stored in the user device is transmitted to the other party's device, food-related food menu, restaurant, or recipe-related app list information configured in the user device may be transmitted together to the other party to the conversation, and when the received image file is viewed, the related app list may be displayed as well, and then, the displayed app list may be reconfigured based on information about the other party and context information.

The concepts of the present invention described above in connection with FIGS. 1 to 38 may be implemented as code in a computer-readable recording medium. The computer-readable recording medium may be, e.g., a portable recording medium (e.g., a CD, DVD, Blu-ray disc, USB storage, or portable hard disk) or a stationary recording medium (e.g., a ROM, RAM, or computer-equipped hard disk). The computer program recorded in the computer-readable recording medium may be transmitted to anther computing device through a network, e.g., the Internet, and be installed on the other computing device to be used on the other computing device.

Although in the drawings the operations are shown in a particular order, it should not be appreciated that the operations should be executed in the particular order or sequentially or all of the operations should be executed to achieve a desired outcome. In a certain context, multitasking and parallel processing may be advantageous. Further, it should be appreciated that the separation of various components in the embodiments described above is not essential, but rather that the described program components and systems may be integrated together into a single software product or be packaged in multiple software products.

Although the methods and the devices and systems for performing the methods have been described above in connection with a number of specific embodiments of the present invention, this is merely an example, and the present invention is not limited thereto, but should instead be interpreted in the broadest scope as complying with the fundamental spirit set forth herein. A skilled artisan may combine or substitute embodiments disclosed to practice patterns not disclosed herein, which would not depart from the scope of the present invention. Besides, a skilled artisan may readily make changes or modifications to the embodiments set forth herein, and it is apparent that such changes or modifications belong to the scope of the present invention. Thus, it should be noted that the above-described embodiments are provided as examples and should not be interpreted as limiting.

The invention claimed is:

1. A method for providing an app list by a device for providing the app list, the method comprising:
receiving a message;
extracting a keyword based on the message;
determining an app list related to the message using the keyword, the app list including at least one app which is installed in the device and one or more apps which are not installed in the device;
generating a deep link for the at least one app using the keyword; and
displaying at least one first app icon, which corresponds to the at least one app, comprising a first marker indicating that the at least one app is capable of executing the deep link and at least one second app icon, which corresponds to the one or more apps, comprising a second marker indicating that the one or more apps are not installed in the device, together with the message.

2. The method of claim 1, wherein receiving the message includes receiving a message group including the message, and extracting the keyword includes extracting the keyword using another message included in the message group, along with the message.

3. The method of claim 2, wherein the message group includes at least one of a first message group further including another message, which is exchanged between a sender's device transmitting the message and the device, and a second message group further including another message, which is transmitted by another device in a place within a predetermined distance from a place where the message is transmitted by the sender's device.

4. The method of claim 1, wherein the message includes multimedia, and
wherein extracting the keyword includes further extracting a keyword related to the multimedia included in the message.

5. The method of claim 1, wherein extracting the keyword includes extracting the keyword through named-entity recognition (NER) on the message and classifying a category of the keyword, and
determining the app list related to the message includes determining the app list related to the message further using the category of the keyword.

6. The method of claim 1, wherein determining the app list related to the message includes, when the message includes a plurality of keywords, determining the app list for each keyword.

7. The method of claim 1, wherein determining the app list related to the message includes determining the app further using personalized information related to a sender generating the message or a recipient receiving the message.

8. The method of claim 7, wherein the sender's personalized information includes at least one of the sender's personal information, device information about the sender's device, and the sender's app use pattern, and the recipient's personalized information includes at least one of the recipient's personal information, device information about the recipient's device, and the recipient's app use pattern.

9. The method of claim 1, wherein determining the app list related to the message includes selecting a plurality of candidate apps based on the keyword, computing a degree of relevance, to the message, of each of the plurality of candidate apps, and determining the at least one app and the one or more apps from among the plurality of candidate apps based on the degree of relevance.

10. The method of claim 1, wherein generating the deep link includes generating another deep link to enable installation of the one or more apps.

11. The method of claim 1, wherein generating the deep link includes generating the deep link further using personalized information related to a sender generating the message or a recipient of the message.

12. The method of claim 1, wherein displaying the at least one first app icon and the at least one second app icon includes computing a degree of relevance, to the message, of each of the at least one app and the one or more apps and sorting the at least one app and the one or more apps based on the degree of relevance.

13. The method of claim 1, wherein displaying the at least one first app icon includes merging the deep link and a name of the at least one app into the message in a text form and displaying the merged message.

14. A device for providing an app list, comprising:
a network interface;
at least one processor;
a memory configured to load a computer program performed by the processor; and
a storage configured to store an app related to a particular keyword, wherein the computer program includes the operation of receiving a message, the operation of determining a keyword based on the message, the operation of determining an app list related to the message using the determined keyword, the app list including at least one app which is installed in the device and one or more apps which are not installed in the device, the operation of generating a deep link for the at least one app using the determined keyword, and the operation of displaying at least one first app icon, which corresponds to the at least one app, comprising a first marker indicating that the at least one app is installed in the device and the deep link is provided and at least one second app icon, which corresponds to one or more apps included in the app list, comprising a second marker indicating that the one or more apps are not installed in the device, together with the message.

* * * * *